United States Patent
LeStrange et al.

(10) Patent No.: US 11,491,732 B2
(45) Date of Patent: Nov. 8, 2022

(54) THREE-DIMENSIONAL (3D) OBJECT PRINTING SYSTEM THAT COMPENSATES FOR MISREGISTRATION

(71) Applicant: Xerox Corporation, Norwalk, CT (US)

(72) Inventors: Jack T. LeStrange, Macedon, NY (US); Alex S. Brougham, Webster, NY (US); Matthew R. McLaughlin, Rochester, NY (US); James L. Giacobbi, Penfield, NY (US); Victoria L. Warner, Caledonia, NY (US)

(73) Assignee: Xerox Corporation, Norwalk, CT (US)

( * ) Notice: Subject to any disclaimer, the term of this patent is extended or adjusted under 35 U.S.C. 154(b) by 158 days.

(21) Appl. No.: 16/812,746

(22) Filed: Mar. 9, 2020

(65) Prior Publication Data

US 2021/0276268 A1    Sep. 9, 2021

(51) Int. Cl.
| | | |
|---|---|---|
| B29C 64/393 | (2017.01) | |
| B33Y 10/00 | (2015.01) | |
| B33Y 30/00 | (2015.01) | |
| B33Y 50/02 | (2015.01) | |
| B29C 64/112 | (2017.01) | |
| B22F 10/00 | (2021.01) | |

(52) U.S. Cl.
CPC ............ B29C 64/393 (2017.08); B22F 10/00 (2021.01); B29C 64/112 (2017.08); B33Y 10/00 (2014.12); B33Y 30/00 (2014.12); B33Y 50/02 (2014.12)

(58) Field of Classification Search
CPC ....... B29C 64/393; B29C 64/112; B22F 10/00
See application file for complete search history.

(56) References Cited

U.S. PATENT DOCUMENTS

| | | | |
|---|---|---|---|
| 5,059,021 | A | 10/1991 | Spence |
| 6,334,720 | B1 * | 1/2002 | Kato ............ B41J 29/393 |
| | | | 400/74 |
| 9,507,555 | B2 | 11/2016 | Liu |
| 10,046,523 | B2 | 8/2018 | Sung |
| 10,155,376 | B1 | 12/2018 | Ireland |
| 10,394,202 | B2 | 8/2019 | Minardi |
| 2006/0111807 | A1 | 5/2006 | Gothait et al. |

(Continued)

OTHER PUBLICATIONS

European Patent Office, Extended European Search Report corresponding to European Patent Application No. 21 15 8836 (15 pages), dated Aug. 3, 2021, Munich, Germany.

*Primary Examiner* — Monica A Huson
*Assistant Examiner* — Kelsey C Grace
(74) *Attorney, Agent, or Firm* — Maginot Moore & Beck LLP

(57) ABSTRACT

A three-dimensional object printer comprises a platen, a gantry positioned above the platen, an ejector head positioned on the gantry, a sensor, and a controller. The controller is configured to operate the ejector to eject at least one drop of material toward the platen at an upper build level and determine process and cross-process differentials between a fiducial and the at least one drop of material deposited on the upper build surface. The controller is also configured to determine an ejector head shift in a process direction and a cross-process direction associated with each of the plurality of build levels based at least in part on the determined process and cross-process differentials and a number of build levels between the base build level and the upper build level.

14 Claims, 14 Drawing Sheets

(56) References Cited

U.S. PATENT DOCUMENTS

| | | | |
|---|---|---|---|
| 2010/0191360 A1* | 7/2010 | Napadensky | B33Y 80/00 700/98 |
| 2015/0147424 A1* | 5/2015 | Bibas | B33Y 50/02 425/150 |
| 2017/0057170 A1 | 3/2017 | Gupta | |

* cited by examiner

THREE-DIMENSIONAL (3D) OBJECT PRINTING SYSTEM THAT COMPENSATES FOR MISREGISTRATION

TECHNICAL FIELD

The devices and methods disclosed in this document relates to three-dimensional object printing and, more particularly, to diagnostic systems in three-dimensional object printers.

BACKGROUND

Digital three-dimensional object manufacturing, also known as digital additive manufacturing, is a process of making a three-dimensional solid object of virtually any shape from a digital model. Three-dimensional (3D) object printing is an additive process in which one or more ejector heads of a 3D printer deposit material to build up a part. Material is typically deposited in discrete quantities in a controlled manner to form layers which collectively form the part. The initial layer of material is deposited onto a substrate, and subsequent layers are deposited on top of previous layers. The substrate is supported on a platform that can be moved relative to the ejection heads so each layer can be printed; either the substrate is moved via operation of actuators operatively connected to the platform, or the ejector heads are moved via operation of actuators operatively connected to the ejector heads. Three-dimensional object printing is distinguishable from traditional object-forming techniques, which mostly rely on the removal of material from a work piece by a subtractive process, such as cutting or drilling.

Care must be taken during manufacture of printer components and initial set-up of 3D printers to ensure that the rails of the gantry, the platen and other components are properly aligned in the process direction (i.e., Y-direction), cross-process direction (i.e., X-direction), and build direction (i.e., the Z-direction). Ideally, the rails in each direction should be perfectly perpendicular to the rails in the other two directions (e.g., the rails in the Z-direction should be perfectly perpendicular to the rails in the X-direction and the Y-direction). Additionally, the ejector head, platen and related components configured to dispense and receive build material along the build axis (i.e., Z-direction) should ideally be properly aligned with the force of gravity during printer set up such that drops of build material fall directly along this axis to the build surface. If the components of the printer are not properly manufactured and aligned as intended, each subsequent layer of a part that is built with the 3D printer will be offset from the previous layer, resulting in a cumulative error with each additional build level (i.e., process and/or cross-process drift will occur with each successive build level and the error will compound), and a poorly built part that does not meet the design specifications. Such misalignment of printer components for any of various reasons may be referred to herein as "misregistration" of the printer which results in drift of the printer in the process and cross-process directions over numerous build levels.

The discussion above indicates that one challenge with printing 3D objects is maintaining precise registration in the cross-process and process directions (i.e., the X and Y directions) over the entire height (Z-direction) of the build levels. Maintaining such precision is particularly acute in low-end 3D printers because they are made with lower quality components having significant error tolerances. Nevertheless, this same problem may also be experienced with high-end 3D printers that include more expensive, precision-machined parts. Therefore, in both high-end and low-end printers, painstaking and time-consuming setup procedures must be followed in order to ensure that all components of the printer are as closely aligned as possible and therefore produce the best possible part. Unfortunately, these setup procedures are difficult to follow, time-consuming to implement, and add to the cost of the 3D printer.

In view of the foregoing, providing an improved 3D printer with an error compensation mechanism and routine that allows low-end printers to produce higher quality parts and that enables high-end printers to be manufactured at a lower cost and be operated with reduced setup time and complications would be beneficial. Being able to integrate such an error compensation mechanism into both newly built printers and existing printers already in operation in the field would also be useful in the art.

SUMMARY

In at least one embodiment, a three-dimensional object printer comprises a platen, a gantry positioned above the platen, an ejector head positioned on the gantry, a sensor, and a controller. The ejector head is configured to move relative to the platen to a plurality of build levels along a build axis and to a plurality of positions defined by process and cross-process coordinates at each of the build levels. The ejector head has at least one ejector configured to eject drops of material toward the platen at the plurality of positions. The sensor is configured to determine differentials between a fiducial and a drop of material at one of the build levels. The controller is operatively connected to the sensor and the ejector head and is configured to move the ejector head relative to the platen from a base build level to an upper build level along the build axis. The controller is further configured to operate the ejector to eject at least one drop of material toward the platen at the upper build level such that the at least one drop of material is deposited on an upper build surface. Additionally, the controller is configured to operate the sensor to determine process and cross-process differentials between the fiducial and at least one drop of material deposited on the upper build surface. The controller is also configured to determine an ejector head shift in a process direction and a cross-process direction associated with each of the plurality of build levels based at least in part on the determined process and cross-process differentials and a number of build levels between the base build level and the upper build level. Thereafter, the controller is configured to move the ejector head and operate the at least one ejector to eject drops of material toward the platen at a plurality of predefined positions associated with each of the plurality of the build levels in order to form a three-dimensional object, wherein moving the ejector head includes shifting the ejector head relative to the platen by the determined ejector head shift associated with the build level for each of the plurality of predefined positions.

In at least one embodiment, a method is disclosed for operating a three-dimensional object printer. The method comprises operating at least one ejector of an ejector head to eject at least one first drop of material toward a first build surface provided on a platen at a first build level along a build axis, and then operating a sensor to measure first distance components of the first drop of material from a first fiducial reference on the first build surface, the first distance components including a first process direction component along a process axis and a first cross-process direction component along a cross-process axis. The method further comprises moving the ejector head relative to the platen along the build axis, and then placing a gauge block on the platen, the gauge block providing a second build surface at a second build level along the build axis. Additionally, the method comprises operating the at least one ejector of the ejector head to eject at least one second drop of material toward the second build surface, and then operating the sensor to measure second distance components of the second drop of material from a second fiducial reference on the second build surface, the second distance components including a second process direction component and a second cross-process direction component. The method further comprises calculating differentials between the first distance components and the second distance components, the calculated differentials including a process direction differential and a cross-process direction differential, and then determining an ejector head shift relative to the platen for a plurality of incremental build levels along the build axis between the first build level and the second build level, wherein the determined ejector head shift for each of the incremental build levels is based on the calculated differentials. Thereafter, the method comprises moving the ejector head and operating the plurality of ejectors to eject drops of material toward the platen in order to form a three-dimensional object, wherein moving the ejector head includes shifting the ejector head relative to the platen by the determined ejector head shift for each of the plurality of incremental build levels prior to ejecting drops of material at said incremental build levels.

In yet another embodiment, a method of operating a three-dimensional object printer comprises operating at least one ejector of an ejector head to eject drops of material toward a platen in order to form a diagnostic shape of a diagnostic object at a base build level, the diagnostic shape having a process direction dimension and a cross-process direction dimension at the base build level. Thereafter, the method comprises moving the ejector head relative to the base build level along a build axis such that the ejector head is moved further away from the base build level, and operating the at least one ejector of the ejector head to build the diagnostic shape of the diagnostic object at an upper build level along the build axis. The method further comprises sensing a process direction dimension and a cross-process direction dimension of the diagnostic shape at the upper build level, and then determining a differential between at least one dimension at the base build level and the upper build level. Additionally, the method comprises determining an ejector head shift for each of a number of incremental build levels between the base build level and the upper build level based at least in part on the determined differential. After determining the ejector head shift, the method comprises moving the ejector head and operating the at least one ejector to eject drops of material toward the platen in order to form a three-dimensional object, wherein moving the ejector head includes shifting the ejector head relative to the platen by the determined ejector head shift for each of the incremental build levels prior to ejecting drops of material at said incremental build levels.

BRIEF DESCRIPTION OF THE DRAWINGS

The foregoing aspects and other features of the method and device are explained in the following description, taken in connection with the accompanying drawings.

DETAILED DESCRIPTION

Figure 1:
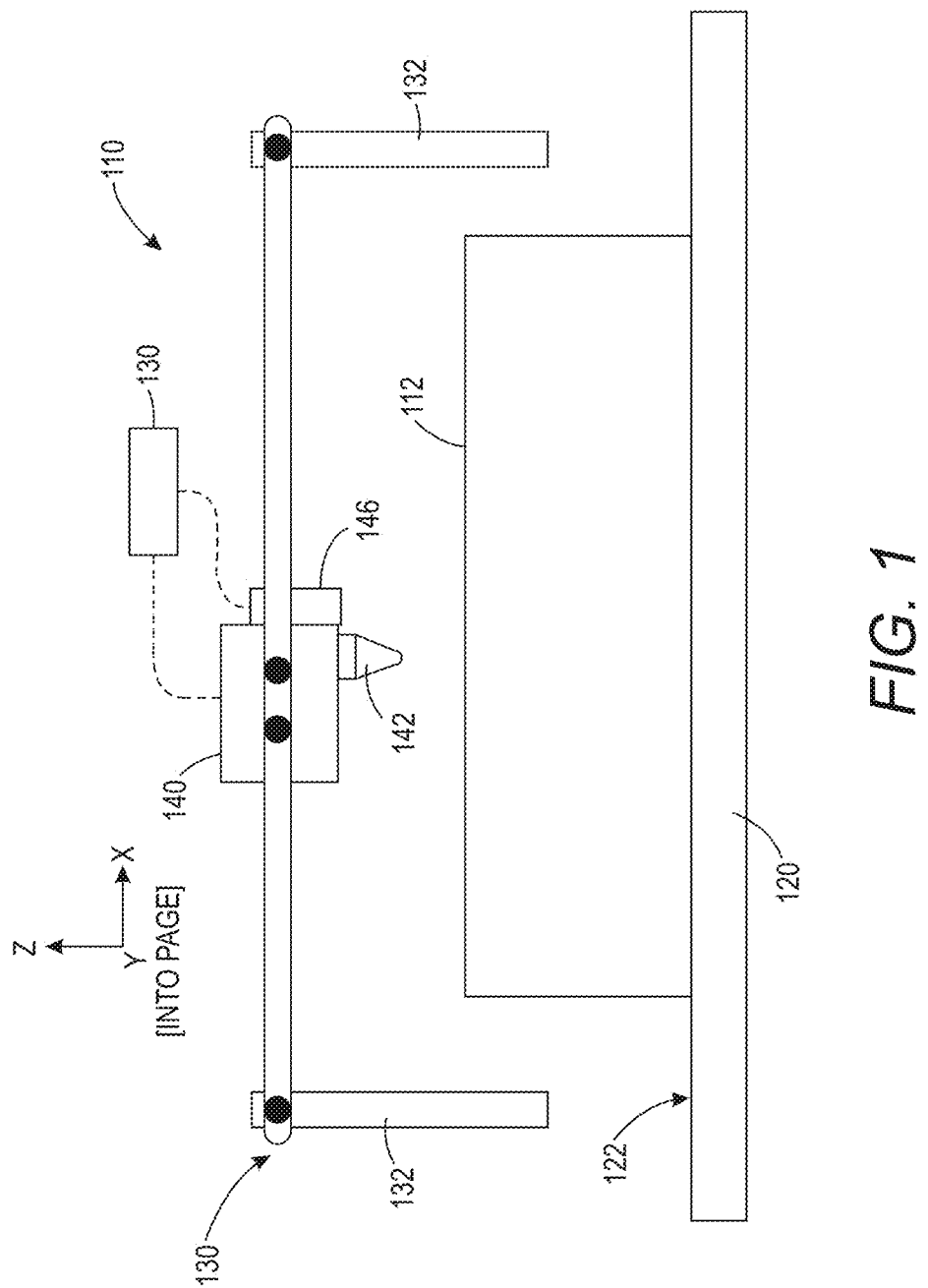
FIG. 1 shows a three-dimensional object printer.

For a general understanding of the environment for the printer and method disclosed herein as well as the details for the printer and method, reference is made to the drawings. In the drawings, like reference numerals designate like elements.

As disclosed herein and explained in further detail below, a three-dimensional object printer includes a sensor configured to determine process and cross-process coordinate differentials between a drop of material and a fiducial at an upper build level. The printer further includes a controller configured to determine an ejector head shift in a process direction and a cross-process direction associated with each of the plurality of build levels based at least in part on the determined process and cross-process coordinate differentials. When building a three dimensional object, the ejector head is shifted by the determined shift amount with each successive build level. As a result, the printer is capable of producing parts with greater accuracy.

FIG. 1 shows an exemplary three-dimensional object printer 110. The printer 110 includes a platen 120, a gantry 130, one or more ejector heads 140, and a controller 150. The platen 120 has substantial planar upper surface 122 upon which three-dimensional objects, such as the part 112, are formed by the printer 110. The ejector head 140 has a plurality of ejectors 142 configured to eject drops of a build material to form three-dimensional objects upon the surface 122 of platen 120. In many embodiments, the plurality of ejectors 142 are arranged in one or more rows in the cross-process direction, X. However, in other embodiments, the plurality of ejectors 142 may instead comprise only a single ejector 142. In some embodiments, the plurality of ejectors 142 includes a first plurality of ejectors configured to eject drops of a build material and a second plurality of ejectors configured to eject drops of a support material, such as wax.

The gantry 130 provides a framework that allows the ejector head 140 to move above the platen 120. To this end, the gantry includes various frame members 132, such as posts, rails, struts and other structural members that support and guide the ejector head 140 as it moves above the platen 120. The gantry 130 is generally configured to facilitate movement of the ejector head 140 in the process, cross-process, and build directions (which may be respectively referred to herein as the "Y," "X" and "Z" directions, or along the "Y-axis," "X-axis" and "Z-axis"). In at least some embodiments, the platen 120 may also be configured to move relative to the gantry in the build direction.

The printer 110 includes a controller 150 operatively connected to the ejector head 140. The controller 150 is configured to operate the ejector head 140 to compensate for proper registration of the ejector head 140 in the cross-process and process directions (i.e., X and Y directions) with each successive build level of printing in the build direction (i.e., Z-direction). To form each layer of the three-dimensional object 112, the controller 150 operates the printer 110 to sweep the ejector head 140 one or more times in the process direction (i.e., Y direction), while ejecting drops of material onto the platen 120 from the ejectors 142. In the case of multiple passes, the ejector head 140 shifts in the cross-process direction (i.e., X direction) between each sweep. After each layer is formed, the ejector head 140 moves away from the platen 120 in the vertical build direction (i.e., Z direction) to begin printing the next layer of the part at the next build level. The gantry 130 and various other actuators (not shown) known in the art are configured to facilitate the aforementioned movements of the ejector head 140 in the X, Y, and Z directions.

The printer 110 further includes a sensor 146 operatively connected to the controller 150 and configured to sense dimensions of the layers of material formed by the printer 100. As discussed in greater detail below, the controller 150 is configured to operate the sensor 146 to measure distances of material deposited by the ejector heads 140 from various fiducials on the upper layer of material. For example, the sensor 146 is configured to measure the process and cross-process distances of a deposited drop of material from a reference mark on the platen or an edge of the part 112 being formed. The sensor 146 is further configured to measure the dimensions of an upper surface of a partially formed part 112, including X, Y and Z dimensions at the upper surface. Accordingly, because the sensor 146 is capable of determining dimensions at various locations along the upper surface of a part 112, the sensor 146 is also configured to detect the existence or non-existence of material at any particular location along the upper surface. In various embodiments, the specific location and/or existence of material at one or more positions on an upper layer may be used to calibrate the printer 110 to reduce or eliminate process and cross-process drift with each successive build level. In one embodiment, the sensor 146 is an optical profilometer configured to move with respect to the platen 120 in the process direction X to scan an entire part 112, one line or row at a time. However, other configurations are possible in which the sensor 146 does not need to move to scan the part 112. Additionally, as shown in FIG. 1, the sensor 146 may be attached to the ejector head 140. However, in other embodiments, the sensor 146 can be configured for movement independent of the ejector head 140 and is not attached to the ejector head in such a configuration.

The printer 110 of FIG. 1 is configured to build a part 112 comprised of any of various build materials as will be recognized by those of skill in the art, including ABS plastic, PLA, polyamide (nylon), glass filled polyamide, epoxy resins, silver, titanium, steel, wax, photopolymers and polycarbonate, to name a few. As noted previously, as the printer moves to each successive build level, drift may occur in build material deposited in the process and cross-process directions when the components of the printer are not perfectly manufactured and aligned. In other words, material deposited in one build level that is intended to be directly above material in a previous build level may not be perfectly aligned in the Z direction. As a result of these imperfections in the printer 110, parts produced by the printer may not be as accurate as designed. Accordingly, as described in further detail below, the printer 110 is configured with error correction components that are designed shift the position of the print head with each build level in order to produce more accurate parts.

Figure 2:
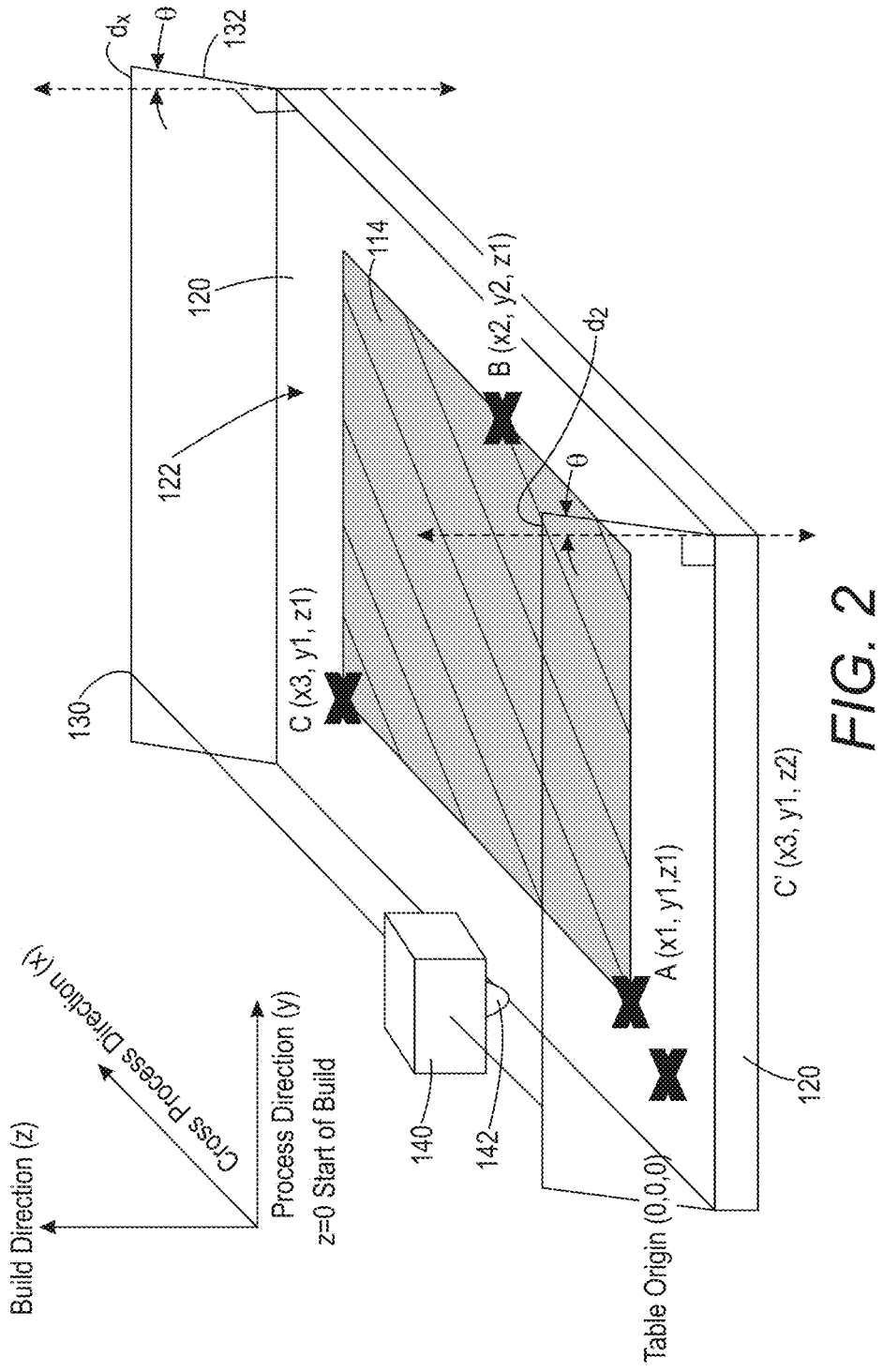
FIG. 2 shows the three-dimensional object printer of FIG. 1 at the start of a build process.
Figure 3:
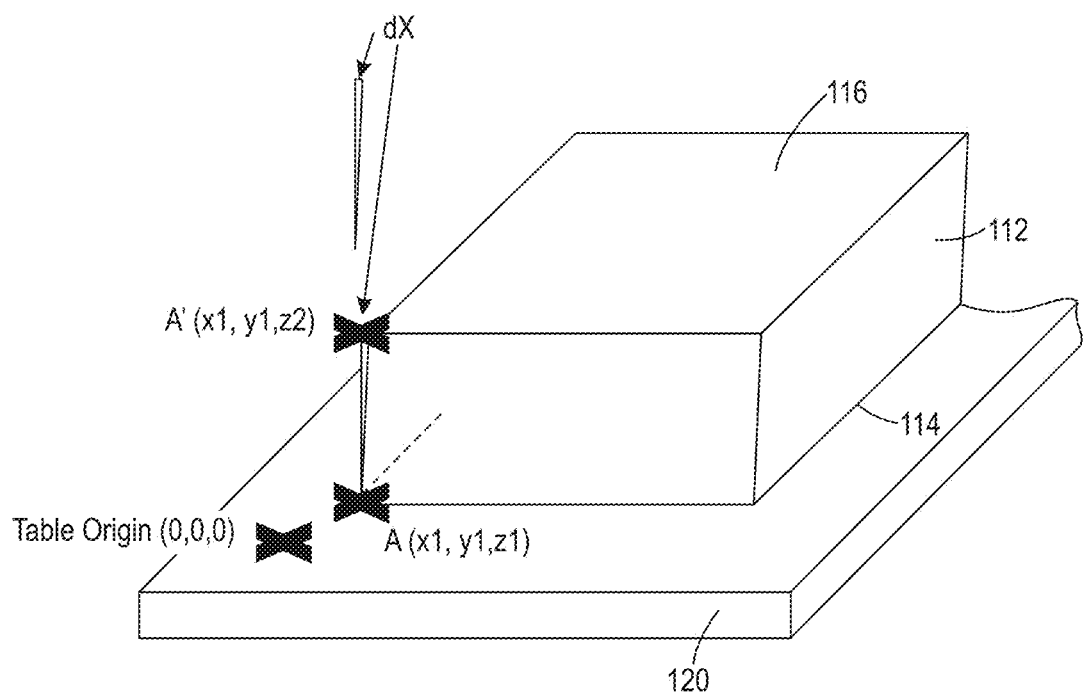
FIG. 3 shows the three-dimensional object printer of FIG. 1 with multiple layers of the build process complete.

With reference now to FIGS. 2 and 3, the printer 110 is shown in an exemplary embodiment wherein the printer 110 has been tasked to build a cuboid shaped part. However, as illustrated in FIG. 2, the printer 110 includes vertical frame members 132 that are not perfectly aligned with other components of the printer. In particular, the vertical frame members 132 are not perfectly perpendicular to the platen 120, but are instead slightly tilted in the X-direction by an angle, $\Theta$. Because of this tilt, a small error accumulates in the part 112 as the printer components move to each new build level.

In order to build the part, the controller 150 of the printer 110 is instructed to deposit build material on the platen 120 at particular coordinates (i.e., cross-process, process and build level coordinates (x,y,z)). FIG. 2 shows a base layer 114 of material deposited on the surface 122 of the platen 120. For example, drops of material that form the base layer 114, include drops deposited at a front left corner, A (x1, y1, z1), a right side edge, B (x2, y2, z1), and a rear left corner, C (x3, y1, z1). As the part is built, the print head 140 moves to successive build levels (i.e., in the Z-direction) and ejects drops of build material toward the platen 120. Because the part in the example of FIGS. 2 and 3 is cuboid shaped, the printer attempts to reproduce the same cross-sectional shape with each new build level. The term "build level," as used herein, refers to the position of a component in the Z direction when it is properly arranged in relation to other printer components such that the printer can together build a particular layer of a part. Thus, two components may be at the same "build level" without being at the same position on the Z-axis. For example, the print head 140, platen 120 and build part 112 may all be considered to be at a single "build level," yet none of these components are at the same position on the z-axis.

FIG. 3 shows a second/upper layer 116 of the part 112 after the printer 110 has completed many build layers between the base layer 114 and the upper layer 116. As noted previously, because of the error in the alignment of the vertical members 132, the part itself becomes misaligned as the print head moves to each additional build level. As the error accumulates, the position of the upper layer 116 of the build part 112 is shifted by some differential amount, dx, as shown in FIG. 3. For example, consider position A (x1, y1, z1) at the base/bottom build layer and position A' (x1, y1, z1) at the upper layer 116 of the part 112. Based on the set up of the printer 110, position A' should be directly above position A since the x and y coordinates are the same (i.e., x1 and y1), and only the z coordinate has changed (i.e., z1 at position A and z2 at position A'). However, as shown in FIG. 3, the actual position of x1 at A' has drifted slightly from the original position of x1 at A by an amount equal to dx. As an example if dx is 0.1 mm, the actual printed position of A' at the upper layer 116 will be shifted slightly in the cross-process direction, e.g., (0.1, 0, 20). This is the case even though the printer recognizes the coordinates of A' to be (0, 0, 20). Therefore, this setup of the printer 110 produces parts that are slightly out of alignment in the cross-process direction unless the printer misregistration compensation method described below is used.

Method of Determining Misregistration Using a Gauge Block

Figure 4:
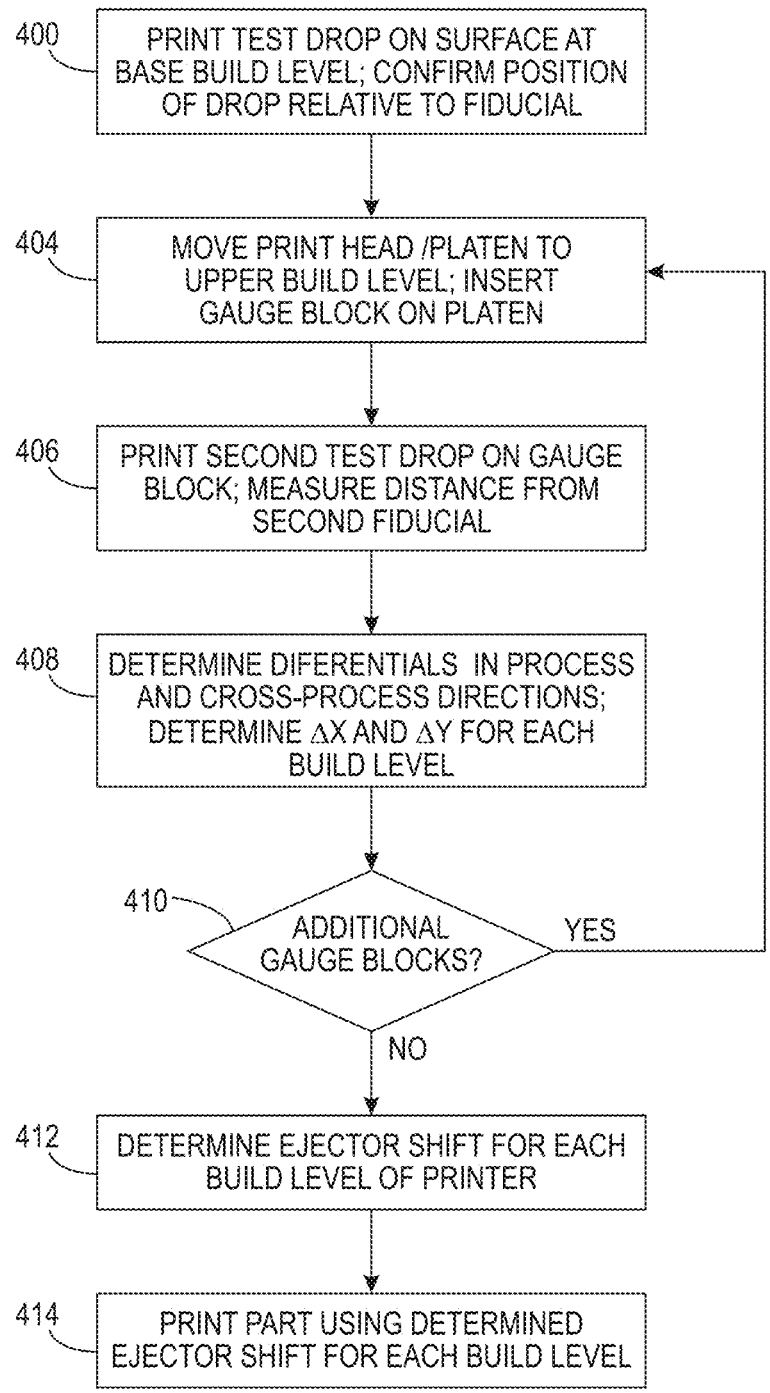
FIG. 4 shows a flow diagram for a method of operating the three-dimensional object printer of FIG. 1.

With reference now to FIG. 4, the controller 150 of the printer 110 is configured to implement a method 400 for compensation of printer misregistration. The method 400 may also be considered to be a method for calibrating the three-dimensional object printer 110 prior to full-scale use of the printer. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 150 noted above can be such a controller or processor. Alternatively, the controller can be implemented with more than one processor and/or associated circuitry and components, each of which is configured to form one or more tasks or functions described herein.

When the method 400 is performed, it begins with the ejector head 140, gantry 130 and platen arranged in a base build level. With the printer components at the base build level, the method begins by ejecting a test drop of build material onto a build surface positioned at a base build level (block 402). For example, the test drop may be printed on the platen 120. The test drop is printed at a specific location on the surface, such as a particular coordinate location, or within a particular distance in the process and cross-process directions from a fiducial. The position of the fiducial is configured to be detected by the sensor 146.

Figure 5:
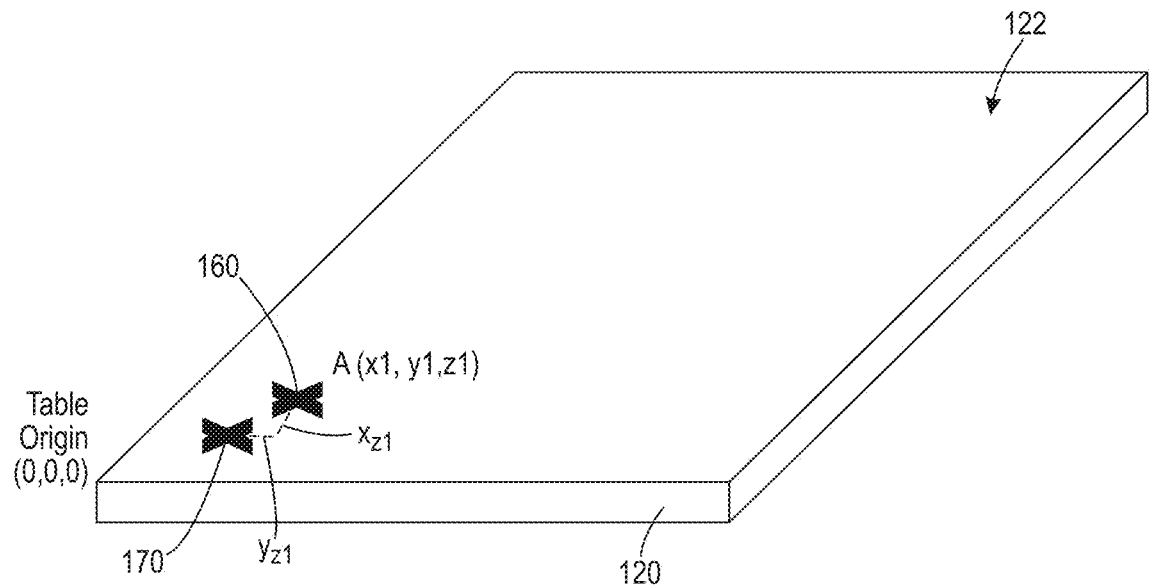
FIG. 5 shows a platen of the three-dimensional object printer of FIG. 1 with a fiducial and a test drop of build material positioned on a platen.

FIG. 5 shows an example of an arrangement that has performed the acts associated with block 402 of FIG. 4. In particular, FIG. 5 illustrates a first test drop 160 (i.e., point "A") printed on the surface 122 of the platen 120 at a predetermined distance from a fiducial 170. The fiducial 170 is located at a known position on the platen 120. The fiducial 170 may be a small mark, bump, depression or other indicia on the platen that may be easily detected by the sensor 146. The test drop 160 is printed at the predetermined distance from the fiducial in the process and cross-process directions, as noted by the designations $y_{z1}$ and $x_{z1}$. In at least some embodiments, the predetermined distance may be directly on top of the fiducial. In other embodiments, the predetermined distance may be some relatively small or relatively large distance from the fiducial. In any event, the sensor 146 is configured to measure the distance between the first test drop 160 and the fiducial 170 in the process and cross-process directions (i.e., $y_{z1}$ and $x_{z1}$) and confirm that this distance is the same as the predetermined distance (or register this distance as the predetermined/original distance).

Returning to FIG. 4, the method 400 continues by moving the print head 140 relative to the platen 120 to an upper build level (block 404). At this upper build level, the print head 140 is further removed from the platen 120 along the Z-axis. With this separation between the print head 140 and the platen, a gauge block is then inserted onto the platen 120. The gauge block is provided in a simple shape (e.g., a cuboid) having a known height (i.e., Z-direction component) and a flat upper surface (i.e., the plane defined by the X-direction and Y-direction components). The gauge block is a precisely machined component and may be manufactured from any of various metals capable of being ground to a high tolerance, thus providing a very accurate dimension in the Z-direction. Similar to the surface of the platen, the upper surface of the gauge block also includes a fiducial that can be detected by the sensor in order to identify a position of the fiducial on the upper surface. Because the gauge block has a known height, the gauge block provides a target build surface at the second build level that is a known offset height above the platen surface 122 in the Z-direction. The gauge block and the platen 120 preferably include registration features in order to precisely position the gauge block on the platen. For example, the platen may include several registration pins and the gauge block may include several complementary cavities, each configured to receive one of the pins. This allows for the gauge block to be positioned on the platen at a very precise location in the process and cross-process directions. Of course, any of various other means for registration may also be used, as will be recognized by those of skill in the art.

Figure 6:
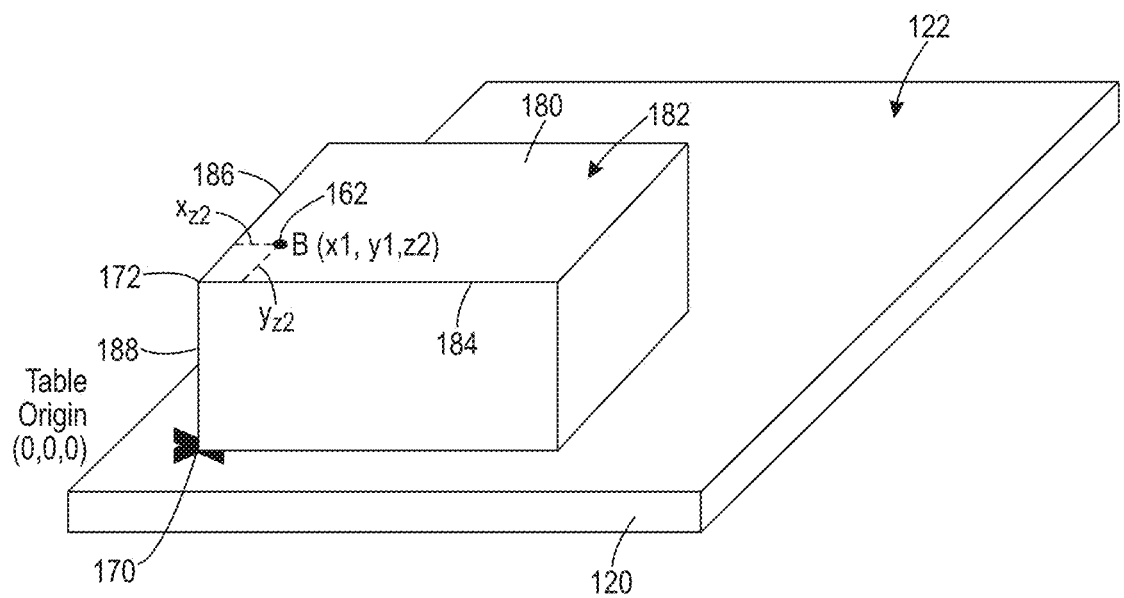
FIG. 6 shows the platen of FIG. 5 with a gauge block positioned thereon and a second fiducial and a second test drop positioned on an upper surface of the gauge block.

FIG. 6 shows an example of an arrangement that has performed the acts associated with block 404 of FIG. 4. FIG. 6 illustrates the gauge block 180 positioned on the surface 122 of the platen 120. In this embodiment, a vertical edge 188 on the left front of the gauge block 180 extends directly upward from the first fiducial 170 on the platen 120 until it terminates at the upper surface 182 of the gauge block. Because the gauge block 180 has a precise cuboid shape, the upper left corner of the gauge block serves as a second fiducial 172 that has the same x-y position (i.e., cross-process, process position) as the first fiducial 170 on the platen. Additionally, because the gauge block 180 is precisely machined in a cuboid shape and precisely positioned on the platen 120 (e.g., via the registration pins or other registration features), the horizontal edges 184 and 186 of the gauge block are also adapted to provide fiducial reference markers (i.e., known positions relative to the platen surface) at the upper build level.

With reference again to FIG. 4, after the gauge block 180 is positioned on the platen 120, a second test drop of build material is ejected onto the gauge block (block 406). The printer deposits this second test drop on the gauge block at a position that the printer determines to be directly above the first test drop on the platen. In other words, the second test drop is ejected when the print head is in a position having the same process and cross-process coordinates as that of the first test drop (but different Z-direction coordinates). The second test drip is ejected without regard to the second fiducial at the second build level. The sensor 146 then measures the distance of the second test drop from the second fiducial at the second build level. Alternatively, the printer deposits the second test drop on the gauge block at another predetermined location (i.e., a location with different process and cross-process coordinates from the first test drop, and the controller accounts for the differing location of the test drop to the fiducial marks for the different build levels.

FIG. 6 shows an example of an arrangement that has performed the acts associated with block 406 of FIG. 4. FIG. 6 illustrates the second test drop 162 (i.e., point "B") deposited on the gauge block 180. As noted above, the printer deposits this test drop at a position with the same process and cross-process coordinates for the printer as the first test drop, without regard to the position of the second fiducial 172. As an example, if the printer coordinates of the first test drop 160 are (x1, y1, z1), the printer coordinates of the second test drop 162 are (x1, y1, z2) (i.e., only the z-direction coordinate is changed). The sensor 146 then measures the actual distances in the process and cross-process directions between the second test drop 162 and the second fiducial 172 at the second build level. In this case, the fiducial 172 at the second build level may be considered to include the upper front horizontal edge 184 and the upper left horizontal edge 186 of the gauge block 180. As shown in FIG. 6, the measured process and cross-process dimensions between the second test drop 162 and the fiducial 172 are $y_{z2}$ and $x_{z2}$.

Returning again to FIG. 4, after the second test drop 162 is printed on the gauge block and the distance dimensions are measured to the second fiducial 172, the controller 150 calculates a measured differential/shift in the process and cross-process directions between the first test drop and the second test drop (block 408). In other words, the controller 150 calculates a process and cross-process drift in the printer between the base build level (e.g., the platen surface 122) and an upper build level (e.g., the upper surface 182 of the gauge block). In the example of FIGS. 5 and 6, the controller 150 calculates the total differential values by determining the difference between $y_{z2}$ and $y_{z1}$ (i.e., $dy=y_{z2}-y_{z1}$), and by determining the difference between $x_{z2}$ and $x_{z1}$ (i.e., $dx=x_{z2}-x_{z1}$). When there is no differential (i.e., no drift) $y_{z2}=y_{z1}$ and $x_{z2}=x_{z1}$ (i.e., there is no actual change in the positions of the process and cross-process coordinates between the base layer and the upper layer). However, if $y_{z2} \neq y_{z1}$ and/or $x_{z2} \neq x_{z1}$, a differential does exist. As an example of the foregoing method for determining a drift in the cross-process and process directions, consider a situation where in FIG. 5, $x_{z1}=10$ mm and $y_{z1}=10$ mm. Consider also that in FIG. 6, $x_{z1}=11$ mm and $y_{z1}=12$ mm. The controller then determines dx as 1.0 mm (i.e., $dx=x_{z2}-x_{z1}=11$ mm−10 mm=1.0 mm), and dy as 2.0 mm (i.e., $dy=y_{z2}-y_{z1}=12$ mm−10 mm=2.0 mm).

With the differentials known, the controller 150 next calculates an incremental delta for each incremental build level (block 408). The incremental delta is calculated by dividing each differential (i.e., dx, dy) by the total number of build levels between the base build level and the upper build level. In other words, $\Delta x=dx/z$ and $\Delta y=dy/z$. Continuing with the foregoing example of FIGS. 5 and 6 wherein dx=1.0 mm and dy=2.0 mm, further consider the total number of build levels between the base build level the upper build level to be twenty levels (i.e., z=20 levels). As a result, the controller determines $\Delta x$ to be 0.05 mm/level, and $\Delta y$ to be 0.10 mm/level (i.e., $\Delta x=dx/z=1.0$ mm/20 level=0.05 mm/level; and $\Delta y=dy/z=2.0$ mm/20 level=0.1 mm/level). With this information calculated, the controller determines that the average differential/drift for each level between z=0 and z=20 is 0.05 mm/level in the cross-process direction and 0.1 mm/level in the process direction.

Returning again to FIG. 4, after the $\Delta x$ and $\Delta y$ are calculated over the height of the first gauge block (e.g., z=20 in the example of FIGS. 5 and 6), a decision is made (block 410) whether additional gauge blocks are used to determine any additional misregistration of the printer or drift across additional build levels (e.g., build levels higher than that associated with the upper surface 182 of the gauge block 180), or if the already calculated $\Delta x$ and $\Delta y$ are used to determine the drift for all build levels of the printer. If additional gauge blocks are to be used at block 410, the method returns to block 404, and the ejector head is moved again to make room for another gauge block. The next gauge block may then be positioned on the first gauge block and the acts of blocks 404-408 are then repeated for an additional set of build levels. Any additional $\Delta x$ and $\Delta y$ values may then be associated with specific build levels of the printer (e.g., z=21 to z=40, etc.). Additional gauges blocks are particularly useful when the misregistration of the printer 110 is not linear from top to bottom. In particular, when the error is non-linear (e.g., consider the possibility of curved rails on the gantry), additional gauge blocks are useful in determining particular build levels associated with more or less drift than other build levels. When no further gauge blocks are to be used in determining printer misregistration, the method continues to block 412.

At block 412, the controller 150 takes all the calculated $\Delta x$ and $\Delta y$ information, and determines an ejector head shift (i.e., $\Delta x$ and $\Delta y$) for each build level of the printer. In various embodiments, the incremental $\Delta x$ and $\Delta y$ values may be the same for each build level. This is the case when only one gauge block is used to determine an average shift over the height of the gauge block, and that average shift is imparted to all of the build levels for the printer. For example, if a printer has fifty build levels, and a gauge block is used to determine the shift over the first twenty build levels, the average shift over those twenty build levels may also be imparted to the remaining thirty build levels. In other embodiments where multiple gauge blocks are used, the $\Delta x$ and $\Delta y$ values may be different over different build levels. For example, if three gauge blocks are used to determine the shift in the same printer with fifty levels, first $\Delta x$ and $\Delta y$ values may be used over the first twenty build levels, second $\Delta x$ and $\Delta y$ values may be used over the next twenty build levels, and third $\Delta x$ and $\Delta y$ values may be used over the final ten build levels. In any event, the controller 150 associates a specific $\Delta x$ and $\Delta y$ value with each build level of the printer prior to printing a part.

In at least one embodiment, the calculated $\Delta x$ and $\Delta y$ values are used to micro-adjust the ejector head on the gantry in order to provide the ejector with the proper shift.

Thus, in the above example where the controller determines $\Delta x$ to be 0.05 mm/level, and $\Delta y$ to be 0.10 mm/level, the adjustment of the ejectors may be accomplished by simply micro-adjusting the print head by the determined shift of 0.05 mm/level in the cross-process direction and 0.1 mm per level in the process direction.

In an alternative approach, instead of micro-adjusting the position of the ejector head 140, the calculated $\Delta x$ and $\Delta y$ values may be provided by shifting the image to be printed in one pixel increments over the range of travel, depending on the ejector head resolution. For example, if the ejector head has a 300 dpi resolution, a one pixel adjustment may be made for approximately every 84 µm. Thus, a 0.05 mm shift (i.e., 50 µm) for each build level may result in a one pixel shift for one build level, but no additional pixel shift in the adjacent level. In accordance with this example, consider the planned pixel shift for a 300 dpi ejector head over three levels. If the desired shift is 0.05 mm (50 µm) per build level, the total desired shift over three levels is 0.15 mm (150 µm). However, if a one pixel shift is made for each build level, the total shift would be 252 µm (i.e., 84×3=252 µm), and this would be a greater amount of shift than desired over these three levels. Therefore, in order to arrive at a total shift that is closer to the desired 150 µm shift, a one pixel shift may be made for only two of the three build levels (e.g., the first and third build level with no additional pixel shift at the second build level). As a result, the total shift over the three build levels would be 168 µm (i.e., 84×2=168 µm), which is much closer to the desired 0.15 mm shift. Thus, the controller 150 is configured to adjust even better the pixels in the numerous build levels over the entire build height of the printer. In other words, with a large number of build levels over a total build the controller can easily determine an appropriate ratio of build levels to pixel adjustments in order to average the desired $\Delta x$ and $\Delta y$ per build level over the entire build (e.g., 5 pixel shift over 7 build levels; 11 pixel shift over 12 build levels, etc.).

After determining the ejector head shift for each build level of a printer (block 412), the method then continues when an actual three-dimensional object is formed based on the determined ejector head shift (block 414). In particular, the printer 110 takes a set of instructions for building a part, including predetermined coordinates where the ejector should fire in order to build the part, and adjusts the instructions based on the determined $\Delta x$ and $\Delta y$ values. As a result, the printer 110 is configured to compensate for misregistration errors and form a more accurate three-dimensional object than would be possible without such the compensation.

Figure 7:
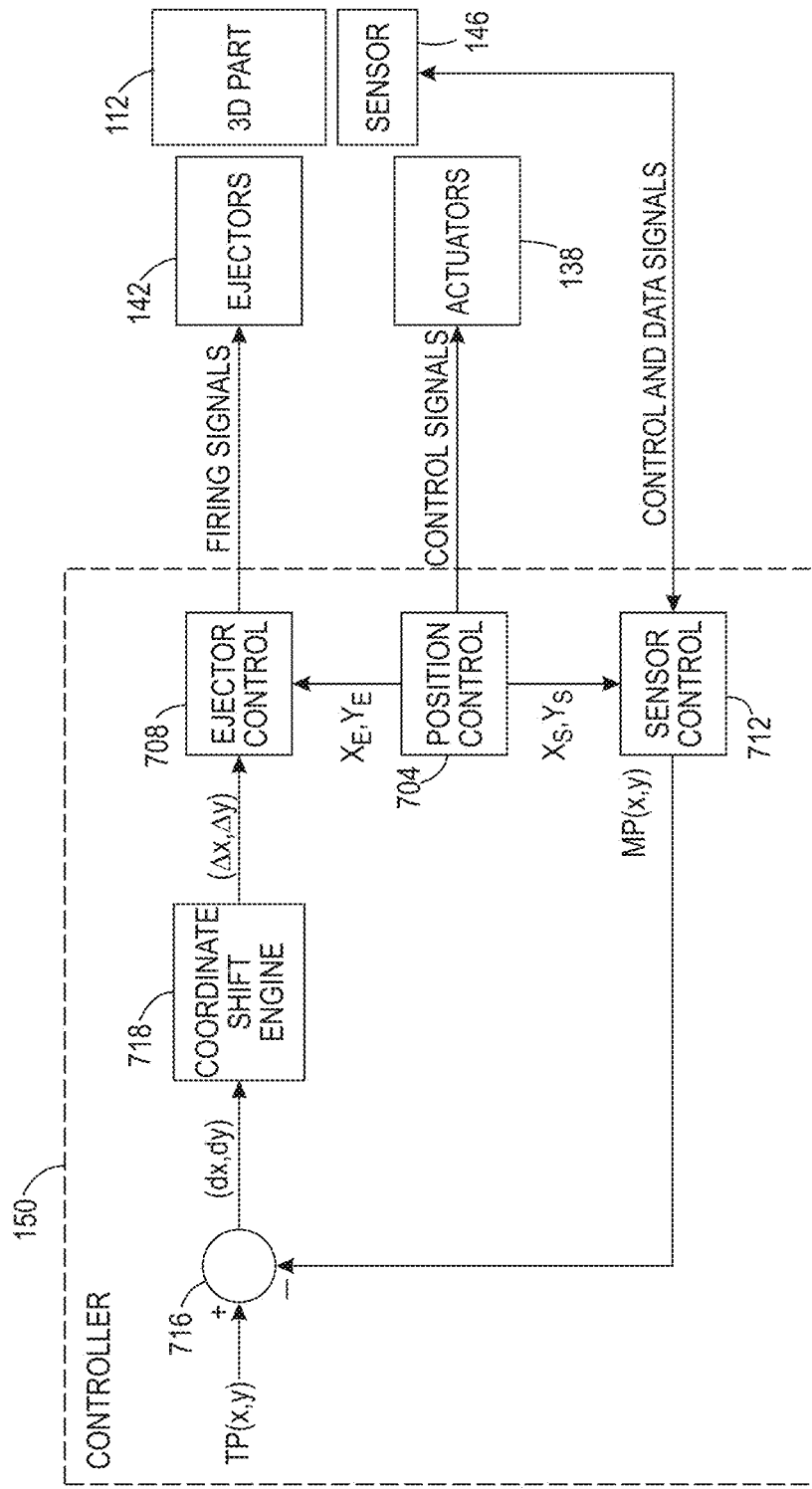
FIG. 7 shows a block diagram of a control system for the three-dimensional object printer of FIG. 1.

FIG. 7 shows a control system diagram for one embodiment of the printer 110. The control system is, in essence, a closed-loop feedback system that uses the sensor 146 to determine an error, for which the system compensates by adjusting process and cross-process components in each build level. In the illustrated embodiment, the controller 150 includes a position control component 704, an ejector control component 708, and a sensor control component 712. The reader should note that the particular arrangement shown and described with respect to FIG. 5 is merely exemplary. One of ordinary skill in the art will understand that many alternative and equivalent arrangements could be employed to achieve similar functions.

The position control component 704 is configured to provide control signals for operating the actuators responsible for providing relative motion of the ejectors 142 and the platen 120 and for providing relative motion of the sensor 146 and the platen 120, as required. Additionally, in one embodiment, the position control component 704 provides relevant position information to the ejector control component 708 and the sensor control component 712. In particular, the position control component 704 provides position information ($X_E$, $Z_E$) to the ejector control component 708, which indicates a position of the ejectors 142 in the process direction Y and in the cross-process direction X. The ejector control component 708 also includes instructions for building a particular part (i.e., a set of predetermined coordinates indicating where build material should be deposited in order to build the desired part). When the ejector control component 708 receives an indication that it is in a position where build material should be ejected based on instructions for a three-dimensional object to be produced, or based on instructions associated with a diagnostic process, the ejector control component 708 sends firing signals to the ejectors 142, causing build material to be ejected therefrom. The position control component 704 also provides position information ($X_S$, $Z_S$) to the sensor control component 712, which indicates a position of the sensor 146 in the process direction Y and in the cross-process direction X.

The sensor control component 712 is configured to operate the sensor 146 to measure the position of various drops of build material in the process and cross-process direction at various build levels. In particular, the sensor control component 712 is configured to measure the position of a drop relative to a fiducial (e.g., a mark, edge, or other reference point) on a particular build surface. The sensor control component 712 is further configured to determine the existence (i.e., presence) or non-existence (i.e., absence) of various build materials and fiducials at any particular cross-process, process location (i.e., (x,y) position) at each build height. The sensor control component 712 is configured to receive signals from the sensor 146 that correspond to the existence or non-existence of materials and fiducials at various build positions. The sensor control component 712 is also configured to receive the position information ($X_S$, $Y_S$) regarding the position of the sensor 132 from the position control component 704. Based on the signals from the sensor 146 and the position information ($X_S$, $Y_S$), the sensor control component 712 is configured to generate a measured distances between a deposited build material and a detected fiducial marker at a given build position, indicated as MP(x,y) in FIG. 7. The sensor control component 712 is also configured to indicate a null condition associated with the absence of build material at a particular build position, when appropriate.

The controller 150 is configured to compare the measured distances of the build material from the fiducial MP(x,y) with a target position for said build material at such layer TP(x,y), and arrive at a differential coordinates for the build material at that layer (dx, dy). These differential coordinates are then sent to a coordinate shift engine 718 that determines the amount of ejector head shift to be associated with each build level. The coordinate shift engine 718 may be configured to divide each the differential coordinates by the total number of the build levels over which the differential coordinates were taken (i.e., based on a known target position), and then multiply those coordinates by the current build level in order to arrive at a coordinate shift ($\Delta x, \Delta y$) for each build level. For example, if the last known target position TP(x,y) was at the base build level (e.g., z=0) and the measured build position MP(x,y) was at build level twenty (i.e., z=20), the coordinate shift engine 718 divides the differential coordinates (dx,dy) by twenty to determine incremental shift coordinates. The incremental shift coordinates are then multiplied by the current build level (e.g., z=5) in order to arrive at the coordinate shift (Δx,Δy) for such build level. The coordinate shift is then delivered to the ejector control 708, which sends signals to the ejectors 142 to fire when they arrive at a given cross-process and process coordinates (x,y) at the current build level. When the ejector fires, a drop of build material is ejected therefrom and deposited on a build surface (e.g., platen, part, support material, etc.). As will be recognized, because the coordinate shift (Δx,Δy) is incremental with each successive build level, the total shift in coordinates is incrementally increased with each successive build level.

As an example of the above described controller operation may be considered in association with the previously described example of FIGS. 5 and 6. In that example, the controller determined Δx to be 0.05 mm/level, and Δy to be 0.10 mm/level. The controller then determined that the average differential/drift for each level to be 0.05 mm/layer in the cross-process direction and 0.1 mm/layer in the process direction. Accordingly, at build level five (i.e., z=5), ejector head shift in the cross-process direction would be 0.25 mm (i.e., 0.05 mm/level×5 levels=0.25 mm), and the ejector head shift in the process direction would be 0.5 mm (i.e., 0.1 mm/level×5 levels=0.5 mm).

In view of the above example, one should note that the coordinate shift engine 718 is capable to determine a pixel adjustment for each of the incremental build levels based on the calculated differentials. As would be understood by a person having ordinary skill in the art, the particular mathematics and operations of the controller 150 may be expressed in many alternative but equivalent forms. For example, the coordinate adjustment for each build level may be represented as a summation of all previous coordinate adjustments for the previously formed layers.

The ejector control 708 is configured to receive the coordinate adjustment for each build layer (i.e., Δx,Δy) from the coordinate shift engine 718. The ejector control 708 takes the predetermined coordinates associated with a planned build, and shifts those coordinates based on the input from the coordinate shift engine 718. For example, consider the foregoing example where the cross-process shift is 0.25 mm and the process shift is 0.5 mm at z=5. If the ejector control 708 has instructions to build a part where the ejector head should fire at position (10, 20, 5), the ejector control 708 would adjust those coordinates to (10.25, 20.5, 5) and wait until the ejector reaches this position before to firing the ejector. Accordingly, the ejector control component 708 is configured to receive position information ($X_E$, $Y_E$) regarding the current position of the ejectors 142 from the position control component 704. Based on the coordinate adjustment for each layer (Δx,Δy) and the current position information ($X_E$, $Y_E$), the ejector control component 708 is configured to provide appropriate firing signals to the ejectors 142. Particularly, the ejector control component 708 is configured to determine new ejector firing positions in each build level based on the coordinate adjustment (Δx,Δy) for that level. In this way, the ejector control component 708 operates the ejectors 142 to remove build direction errors that result from poor manufacturing tolerances or poor set-up of the 3D object printer 110.

The three-dimensional object printer described above in association with FIGS. 1-7 is but one exemplary embodiment of a printing system and method of operation configured to compensate for misregistration. Various alternative embodiments of such a printer and method are also possible and contemplated by the disclosure provided herein.

Method of Determining Misregistration by Forming a Diagnostic Object

With reference now to FIGS. 8A-13, in at least one alternative embodiment, the three dimensional printer is configured to determine a process and cross-process drift associated with various build levels along the Z-axis by printing one or more diagnostic objects. The one or more diagnostic objects are printed in lieu of using the one or more gauge blocks described in FIGS. 4-6. In particular, instead of using the above-described gauge block 180 to detect process and cross-process differentials between a base build level and an upper build level, diagnostic objects may be used to determine the differentials. According to this embodiment, the sensor 146 of the printer 110 is used to measure various dimensional components and/or features of a diagnostic object. The diagnostic object is printed with appropriate features to convey the proper settings to the operator through graduated part angles and/or dimensions. As an example, and as explained in further detail below, visual feature failures such as the absence of build materials at a particular build level may be used to quantify an adjustment to feed back into the control system.

Figure 8A:
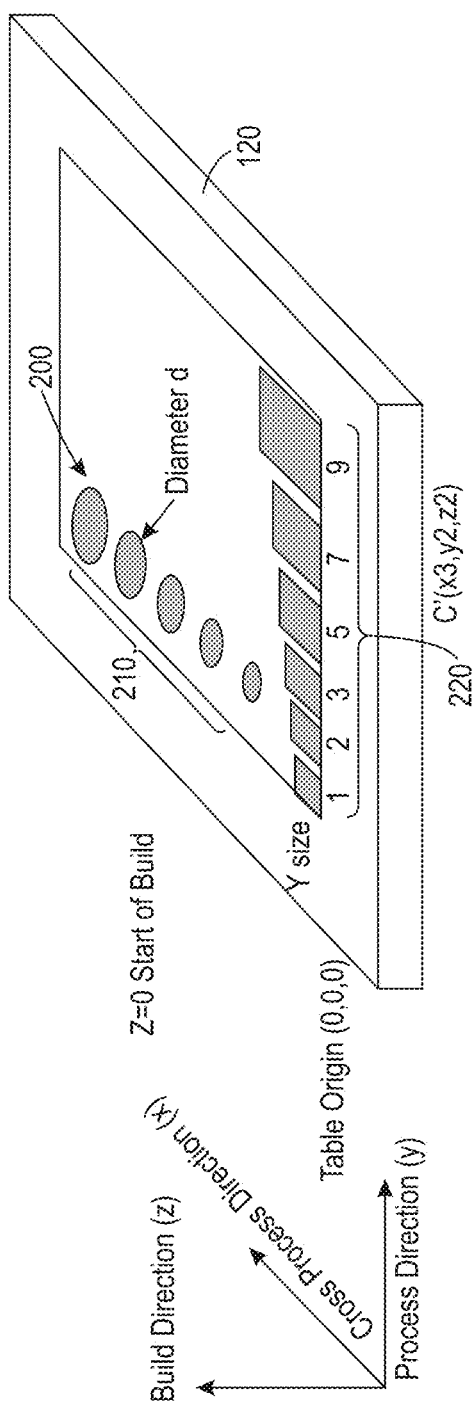
FIG. 8A is an illustration of a series of diagnostic objects formed at a base build level using the printer of FIG. 1.
Figure 8B:
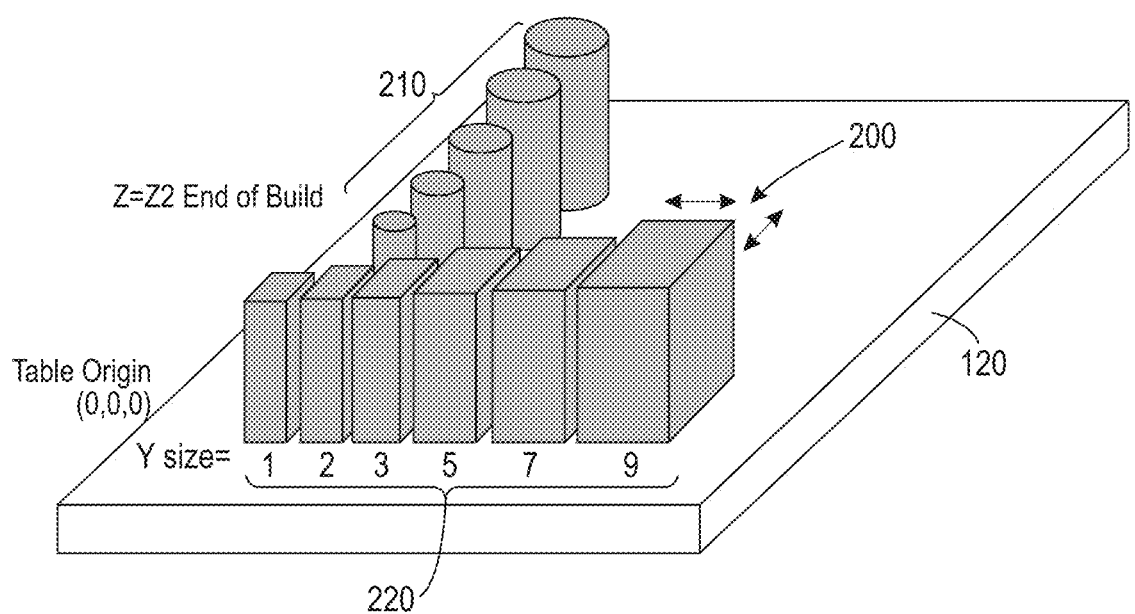
FIG. 8B is an illustration of the diagnostic objects of FIG. 8A at an end build level.

FIGS. 8A and 8B shows a series of diagnostic objects 200 printed by a printer 110 on a platen 120. FIG. 8A shows the diagnostic objects 200 at a base build level (i.e., Z=0). FIG. 8B shows the diagnostic objects 200 at an end build level (i.e., Z=Z2). The diagnostic objects 200 are provided in the form of numerous column structures of different sizes and shapes. The diagnostic objects include a series of first cylindrical columns 210 positioned along the cross-process direction and a series of second cylindrical columns 220 positioned along the process direction. As best shown in FIG. 8A, the first cylindrical columns 210 all have a circular cross section with the cross-sectional diameter of each subsequent column greater than that of the previous column along the x-axis. The second cylindrical columns 220 all have a rectangular cross section with the cross-sectional diameter of each subsequent column greater than that of the previous column along the y-axis. Depending on the diagnostic features incorporated into the columns 200, the columns may be built from different materials and with different drop size/spacing, etc.

While each of the columns of FIGS. 8A and 8B are shown in the ideal state with no misregistration in the printer that results in drift (i.e., no x-direction or y-direction drift in successive build level), each of the columns 200 of FIGS. 8A and 8B includes diagnostic features provided by the cross-sectional shape and size of the column. In particular, the columns 200 are configured such that as x-direction and y-direction errors accumulate during the build, any jetted material that is beyond the pillar feature boundary as built in the previous layer, will not be supported and will jet into the gap past the edge of the pillar. Accordingly, the gap designed between the columns 200 accounts for this so as to not jet on adjacent pillars. For example, assuming the columns are configured to detect a maximum error of 5 mm in either the x-direction or the y-direction, the gap between the columns 200 is 6-7 mm gap, thus providing plenty of spacing to allow build materials to fall to the bottom of the platen 120 between the columns 200.

Figure 9A:
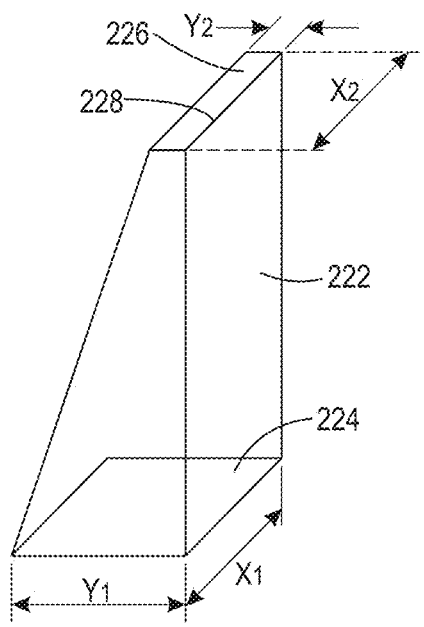
FIG. 9A shows a perspective view of a first diagnostic object formed with the printer of FIG. 1 showing misregistration of the printer in the process direction.
Figure 9B:
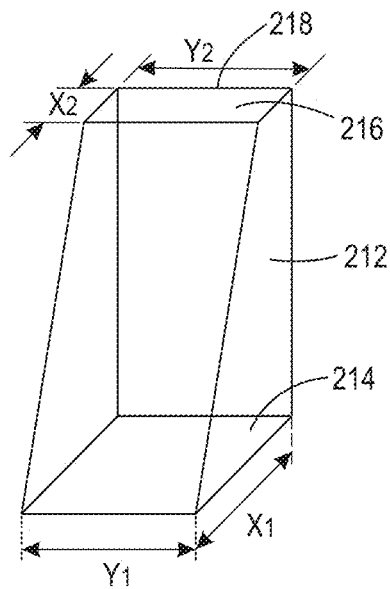
FIG. 9B shows a perspective view of a second diagnostic object formed with the printer of FIG. 1 showing misregistration of the printer in the cross-process direction.
Figure 9C:
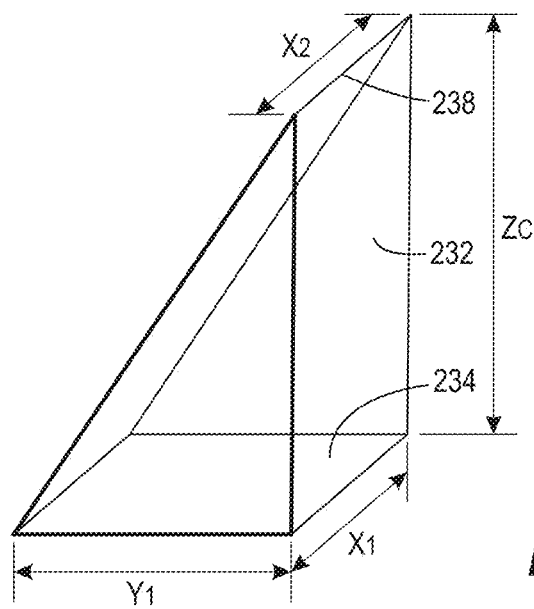
FIG. 9C shows a perspective view of a third diagnostic object formed with the printer of FIG. 1 showing misregistration of the printer in the process direction and such that a diagnostic feature of the object is absent.

With reference now to FIGS. 9A-9C, three exemplary diagnostic objects are shown with diagnostic features that that illustrate misregistration of the printer. In the example of FIG. 9A, the diagnostic object is a column 222 and the diagnostic feature is the cross-sectional shape of the column. At the base build layer 224, the cross-process dimension of the column 222 is $x_1$, and the process dimension of the column is $y_1$. At the upper build layer 226, the cross-process dimension of the column 222 is $x_2$, and the process dimension of the column is $y_2$. As shown in FIG. 9A, $x_2$ is very similar in dimension to $x_1$, but $y_2$ is much less than $y_1$. This illustrates a primary error/misregistration for the printer in the process direction (i.e., y-direction). In other words, with each successive layer built by the printer, a process direction error/drift accumulates. As the process coordinates drift (i.e., to the right in FIG. 9A) with each successive build layer, build material falls off of the right boundary/edge 228 of the object and onto the platen (or other substrate on which the base layer 224 rests). Accordingly, by observing the cross-sectional shape of the column 222 as a diagnostic feature, a misregistration/error in the printer is indicated in the process direction. In order to determine the precise amount of error between the base build level and the upper build level, the differential in the process and cross-process dimensions may be taken (i.e., $dy=y_2-y_1$; $dx=x_2-x_1$).

With reference now to the example of FIG. 9B, the diagnostic object is again a column 212 and the diagnostic feature is the cross-sectional shape of the column. At the base build layer 214, the cross-process dimension of the column 212 is $x_1$, and the process dimension of the column is $y_1$. At the upper build layer 216, the cross-process dimension of the column 212 is $x_2$, and the process dimension of the column is $y_2$. As shown in FIG. 9B, $x_2$ is much less in dimension than $x_1$, but $y_2$ is similar to $y_1$. This illustrates a primary error/misregistration for the printer in the cross-process direction (i.e., x-direction). In other words, with each successive layer built by the printer, a cross-process direction error/drift accumulates. As the cross-process coordinates drift (i.e., toward the rear in FIG. 9B) with each successive build layer, build material falls off of the back boundary/edge 218 of the object and onto the platen (or other substrate on which the base layer 214 rests). By observing the cross-sectional shape of the column 212 as a diagnostic feature, a misregistration/error in the printer is indicated in the cross-process direction. In order to determine the precise amount of error between the base build level and the upper build level, the differential in the process and cross-process dimensions may be taken (i.e., $dy=y_2-y_1$; $dx=x_2-x_1$).

With reference now to the example of FIG. 9C, another diagnostic column 232 is shown similar to that of FIGS. 9A and 9B, but with a more extreme example of a printer having an error in the process direction. In this example, the drift in the process direction has accumulated to the extent that the upper cross-sectional shape of the column 232 is absent/non-existent. In this example, at the base build layer 234, the cross-process dimension of the column 232 is $x_1$, and the process dimension of the column is $y_1$. However, all build material at an upper build level (e.g., similar to the height of the columns 222 and 212 of FIGS. 9A and 9B) is missing/absent, as it has all fallen off a right boundary/edge 238. The shape of this edge 238 indicates that the error was primarily in the process direction (y) because the edge is aligned in the cross-process direction (x). In other words at the right edge 238, $x_2$ is about the same as $x_1$, but $y_2$ is null. By observing the build level where $y_2$ became null, a process-direction error/drift equal to $y_2$ can be noted at that build level. If the difference in $x_2$ and $x_1$ is also measured at this build level, a differential in the cross-process direction may also be determined.

Figure 10:
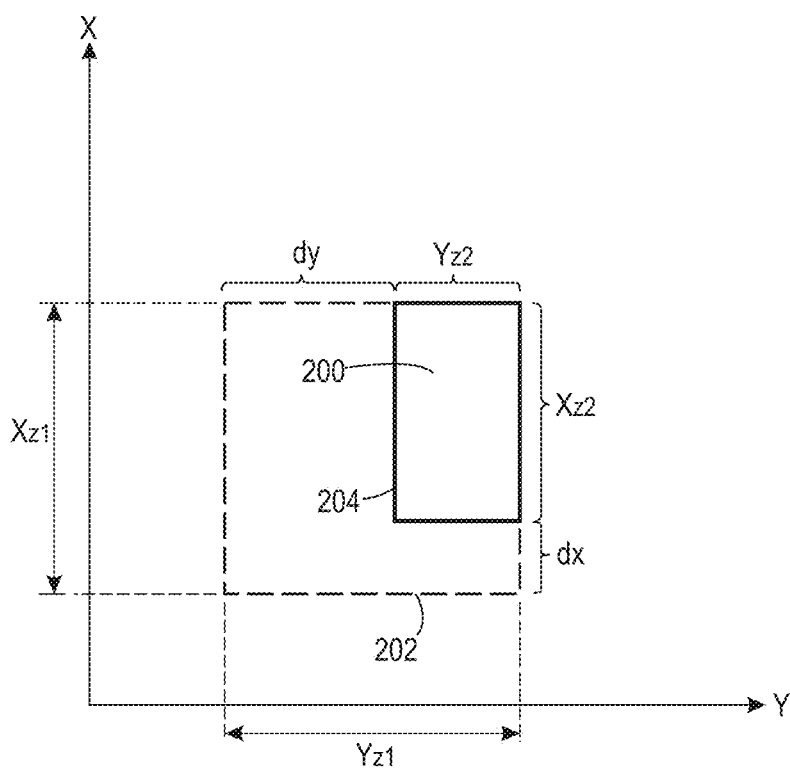
FIG. 10 illustrates a plan view of a diagnostic object formed with the printer of FIG. 1 showing misregistration of the printer in both the process and cross-process directions.

FIG. 10 illustrates a particular example of how the cross-sectional shape of a diagnostic column 200 may be used as a diagnostic feature to indicate process and cross-process drift in a printer 110 between a base build level and an upper build level. In FIG. 10 a top/plan view of the diagnostic column 200. The rectangular shape shown by the dotted lines indicates the dimensions of the diagnostic column 200 at a base build layer 202 (i.e., at the base build level for the printer 110). The dimensions at the base build level are $x_{z1}$, $y_{z1}$. The rectangular shape shown by the solid lines indicate the dimensions of the diagnostic column 200 at an upper build layer 204 (i.e. at an upper build level for the printer 110). The dimensions at the upper build level are $x_{z2}$, $y_{z2}$. To determine the error of the printer 110 at the upper build level, the printer determines a differential by subtracting the dimensions at the upper build level from those at the base build level (i.e., $dx=x_{z2}-x_{z1}$; $dy=y_{z2}-y_{z1}$). For example, consider a situation where $x_{z1}=20$ mm, $y_{z1}=20$ mm, $x_{z2}=15$ mm, and $y_{z2}=8$ mm. In this case $dx=5$ mm (i.e., $dx=20-15=5$ mm) and $dy=12$ mm (i.e., $dy=20-12=8$ mm). Based on these measured differentials, the diagnostic column 200 many then be used to determine a drift associated with each build level of the printer between the upper build level and the based build level. For example, consider in the above example that the base build level is at $z=1$ and the upper build level is at $z=50$. In this example 50 build levels exist. In order to determine the drift associated with each build level the respective differentials, dx, dy, are simply divided by fifty to arrive at the drift for each build level. In other words, $\Delta x=dx/50=5$ mm/50 levels=0.1 mm/level; and $\Delta y=dy/50=8$ mm/50 levels=0.16 mm/level. Thus, as illustrated in FIG. 10, in at least one embodiment, printer drift/misregistration for each level of a printer can be determined by printing a diagnostic column, measuring the dimensions of a diagnostic column at an upper build level and a base build level, calculating the associated differentials in the process and cross-process directions, and then dividing the differentials by the number of build levels. In various embodiments, this process may be repeated over numerous sub-sets of build levels (e.g., every tenth build level), such that different drift amounts are calculated in associated with different sets of build levels.

Figure 11A:
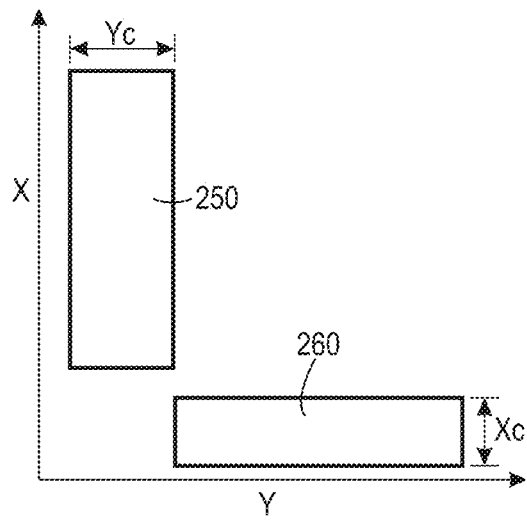
FIG. 11A illustrates a plan view of a base layer of two diagnostic objects formed with the printer of FIG. 1, including a first diagnostic object elongated in the process direction and a second diagnostic object elongated in the cross-process direction.
Figure 11B:
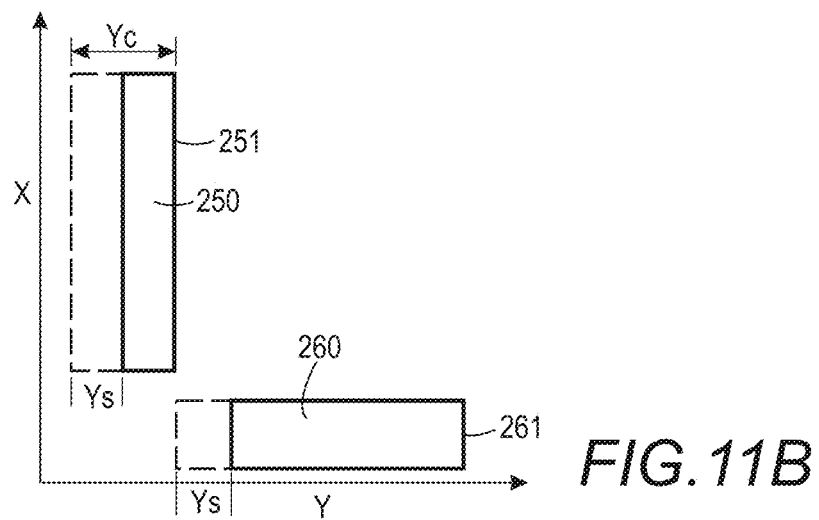
FIG. 11B illustrates a plan view of an intermediate layer relative to the base layer of the two diagnostic objects of FIG. 11A.
Figure 11C:
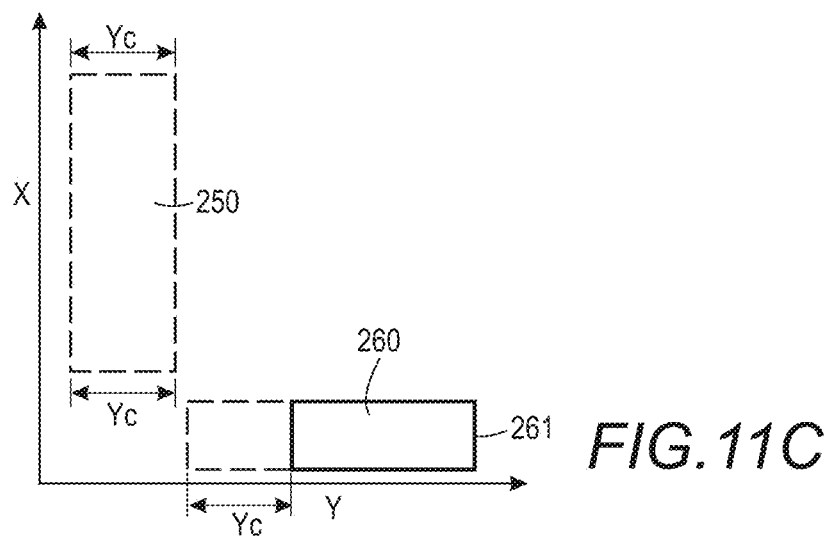
FIG. 11C illustrates a plan view of an upper layer of the first diagnostic object and the second diagnostic object of FIG. 11A relative to the base layer.

In at least one embodiment, instead of measuring cross-sectional dimensions of a diagnostic column at a base build level and an upper build level, diagnostic features may be incorporated into the diagnostic columns such that sensor recognizes a nominal error when a feature disappears. This is similar to the tread depth marks on a tire wherein when the error is equivalent to the feature dimension, the feature disappears. As an example of this, consider the arrangement such as FIGS. 11A-11C where a plan/top two diagnostic objects 250, 260 are shown, each having a diagnostic feature provided by a cross-sectional shape. In this example, the disappearance of one of the shapes is indicative of a predetermined amount of error. In FIGS. 11A-11C the two diagnostic columns 250 and 260 each have a rectangular cross-sectional shape with a first diagnostic column 250 elongated in the cross-process direction and a second diagnostic column 260 elongated in the process direction. FIG. 11A shows a base layer of the diagnostic columns; FIG. 11B shows an intermediate layer of the diagnostic columns; and FIG. 11C shows an upper layer of the diagnostic columns (with the base layer shown in dotted lines in FIGS. 11B and 11C for the sake of illustration). In the example of FIG. 11A-11C, the printer has a primary error in the process direction, with little or no error in the cross-process direction. Accordingly, as shown in FIG. 11B, at an intermediate layer the diagnostic columns 250 and 260 are both shifted to the right (i.e., in the process direction) by an amount equal to $y_s$. At this intermediate layer, the right side edges 251, 261 of the diagnostic columns 250, 260 remain in a known position because build material falls to the right of the diagnostic columns and onto the platen at these locations since there is no supporting material to the right of these edges (similar to FIG. 10, the boundaries of the base layer are shown in dotted lines in FIGS. 11B and 11C). As shown in FIG. 11C, at some upper build level the error in the process direction is critical such that no additional build material is deposited on the first diagnostic column 250. In particular, when the error in the process direction is equal to $y_c$ (i.e., the original process direction dimension of the first diagnostic column 250), no additional build material is deposited onto the first diagnostic column 250. Thus, as shown in FIG. 11C, by detecting that no additional build material is present at the upper build level, the system recognizes that the process direction error at the upper build level is equal to $y_c$.

Figure 12A:
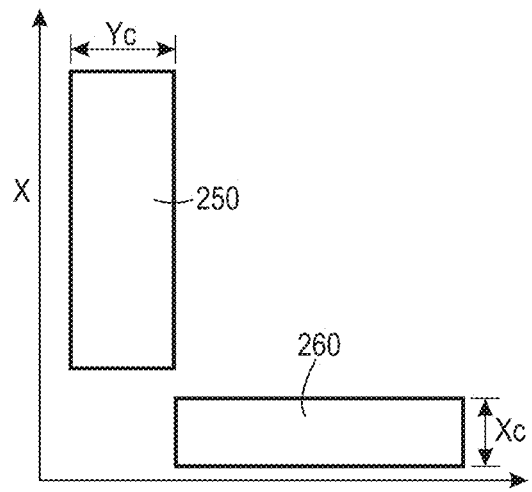
FIG. 12A illustrates a plan view of a base layer of two diagnostic objects formed with the printer of FIG. 1, including a first diagnostic object elongated in the process direction and a second diagnostic object elongated in the cross-process direction.
Figure 12B:
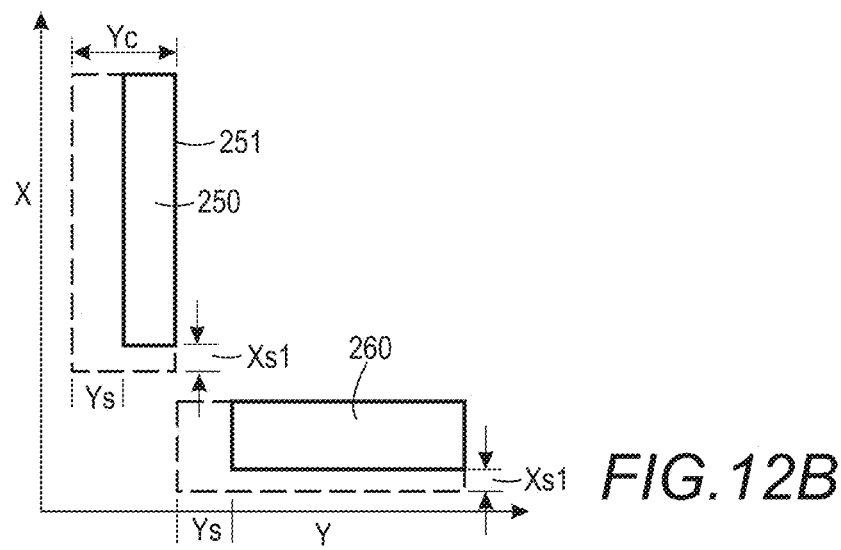
FIG. 12B illustrates a plan view of an intermediate layer relative to the base layer of the two diagnostic objects of FIG. 12A.
Figure 12C:
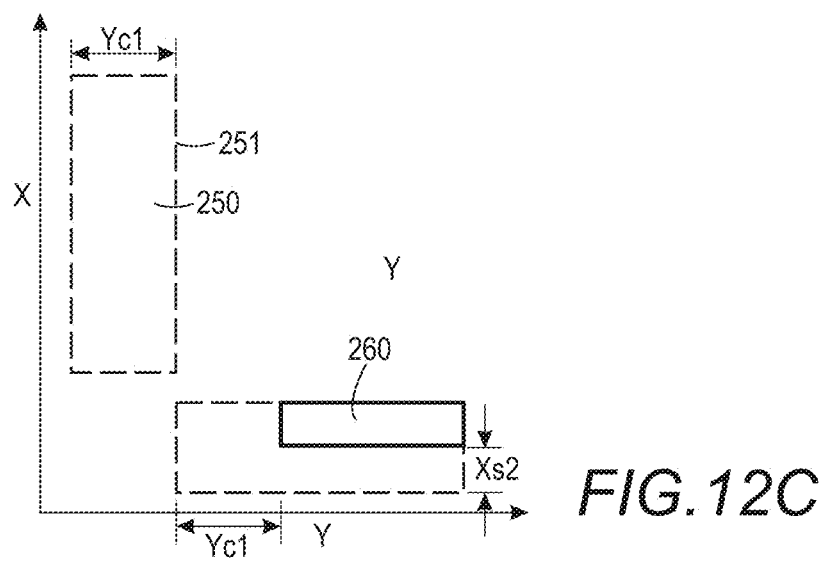
FIG. 12C illustrates a top view of an upper layer of the first diagnostic object and the second diagnostic object of FIG. 11A relative to the base layer.

With reference now to FIGS. 12A-12C, a similar arrangement to FIGS. 11A-11C is shown, but in this example, the printer has drift error in both the process and cross-process directions. As shown in FIG. 12A, the two diagnostic columns 250 and 260 are respectively elongated along the cross-process and process directions. Because of this, they are configured to recognize nominal errors in both the cross-process and process directions based on the disappearance of build material in the respective columns. Diagnostic column 250 has a lesser dimension in the process direction equal to $y_c$. Diagnostic column 260 has a lesser dimension in the cross-process direction equal to $x_c$. As shown in FIG. 12B, as the diagnostic columns are built, the cross-sectional dimensions are reduced at intermediate build layers in both the cross-process and process dimensions. As shown in FIG. 12C, at a first upper build layer, the material associated with diagnostic column 250 is absent, indicating that the process direction differential is equal to $y_c$ at this build level (i.e., $dy=y_c$). If the system then continues to build the second diagnostic column 260, the build material associated with this column 260 eventually becomes absent as well (although this is not illustrated in the figures). At this build level where the build material for diagnostic column 260 is absent, the system recognizes that the cross-process direction differential is equal to $x_c$ at this build level (i.e., $dx=x_c$). Accordingly, the printer arrangement of FIGS. 12A-12C is configured to form diagnostic columns with cross-sectional shapes such that the sensor recognizes a nominal error/differential in either the process or cross-process direction when a feature disappears.

In the example of FIG. 12A-12C, the error in one direction can be so minor that the disappearance of one of the diagnostic columns can be mistakenly associated with the wrong error. For example, consider the arrangement of FIGS. 11A-11C, wherein the error is primarily in the process direction. In this case, if the diagnostic column 260 continues to be built after the layer associated with FIG. 11C until the build material of column 260 is absent/disappears at an upper level, the reason for such disappearance is due to a process direction error. If the system mistakenly recognizes this disappearance as a cross-process direction error, the system also mistakenly identifies a differential in the cross-process direction. Accordingly, in at least some embodiments, the system is configured to measure a rate of change in process and cross-process dimensions at differently layers in order to determine whether the absence of a particular feature may be reasonably attributed to a particular type of error. For example, at the build level associated with FIG. 12C, the system may recognize that the rate of change of $X_{s2}$ relative to the remaining length of the diagnostic column 260 in the process direction is sufficient such that the disappearance of diagnostic column 260 at a certain future build level is indicative of a differential in the cross-process direction that is equal to $X_{s2}$.

Figure 13:
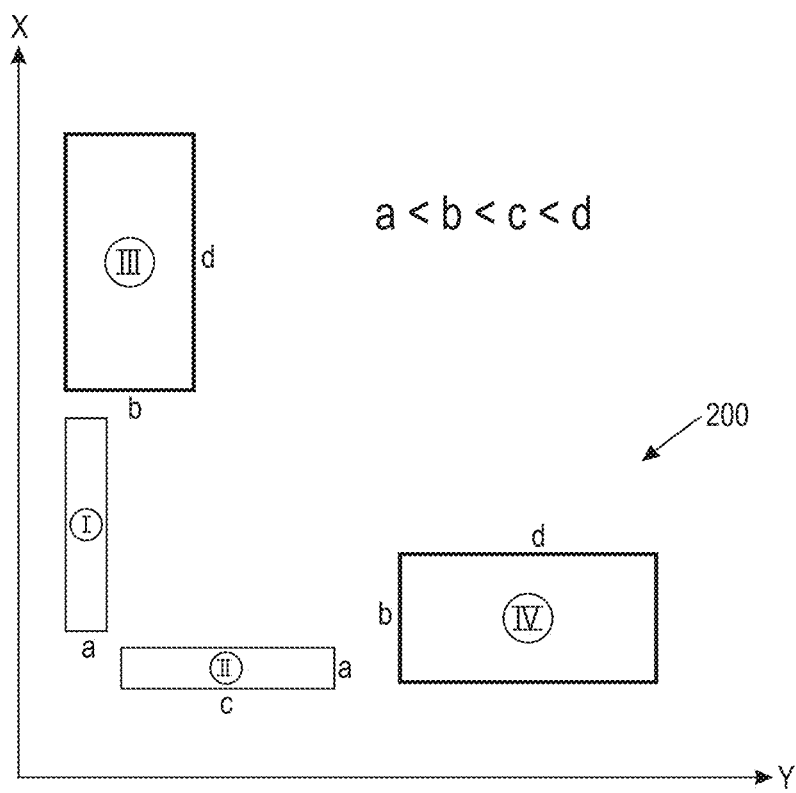
FIG. 13 illustrates a plan view of a base layer of four diagnostic objects formed with the printer of FIG. 1, including first and second diagnostic objects elongated in the process direction and third and fourth diagnostic objects elongated in the cross-process direction.

Yet another example of a printer arrangement configured to form diagnostic columns with cross-sectional shapes such that the sensor recognizes a nominal error/differential in both the process and cross-process directions is shown in FIG. 13. In this example, four diagnostic columns are built, including two in the cross-process direction (identified as columns I and III), and two in the cross-process direction (identified as columns II and IV). Both of columns I and II have dimensions "a" and "b," but in opposite directions (i.e., dimension "a" is in the process direction in column I, but in the cross-process direction in column II; and "c" is in the cross-process direction in column I, but in the process direction in column II). Similarly, both of columns III and IV have dimensions "b" and "d," but in opposite directions. Furthermore, the size of these dimensions is such that a<b<c<d. Similar to the arrangement of FIGS. 12A-12C, the printer builds the columns I-IV until one of columns I or II disappears (i.e., build material is absent at that build level). At that point, the system recognizes the following:

If column I disappears first, then the error is primarily a process direction error with a process-direction differential equivalent to "a" at the build level of the disappearance; and If column II disappears first, then the error is primarily a cross-process direction error with a differential equivalent to "a" at the build level of the disappearance.

After column I or II disappears, the printer continues to build the diagnostic columns until another column disappears. Depending on which column disappears next, the system can recognize the following:

If column I disappeared first, and column II disappears second, then the error associated with the disappearance of column II is attributable to a cross-process error with a differential equivalent to "a" at that build level associated with the disappearance of column II;

If column I disappeared first, and column III disappears second, then the error associated with the disappearance of column III continues to be a process direction error, and no determination of the cross-process direction error can be made based on this disappearance of column III;

If column II disappeared first, and column I disappears second, then the error associated with the disappearance of column I is attributable to a process error with a differential equivalent to "a" at that build level associated with the disappearance of column I; and If column II disappeared first, and column IV disappears second, then the error associated with the disappearance of column IV continues to be a cross-process direction error, and no determination of the process direction error can be made based on this disappearance of column IV.

The foregoing order of column disappearance may provide valuable insight for the printer in order to provide the best possible accuracy for the printer. For example, when columns I and II are the first two columns to disappear, an incremental shift ($\Delta x$ and $\Delta y$) for each build level of the printer may be determined using the method described below. Alternatively, when either of columns III and IV disappear prior to one of columns I or II, it may be determined that either (i) the error in one direction is so minimal that no incremental shift is needed, or (ii) the error in the opposite direction is so great that instructions should be provided to the user to perform the mechanical setup of the printer once again in an attempt to minimize the error by mechanical means.

The foregoing examples of FIGS. 11A-13 are but a few possible configurations of diagnostic objects with features that may be used to determine an appropriate coordinate shift for each build level of the printer. As noted previously, various shapes and sizes of diagnostic objects may be used in numerous configurations in order to provide different types of information to the user about the drift/error between build levels. Furthermore, in at least one alternative embodiment, both build and support materials may be used when printing the diagnostic objects. In such an embodiment, material jetted off of a column boundary could be supported by the support material, and this would allow the object to maintain a cross-section that is dimensionally accurate by simply shifted in the x and/or y directions.

Figure 14:
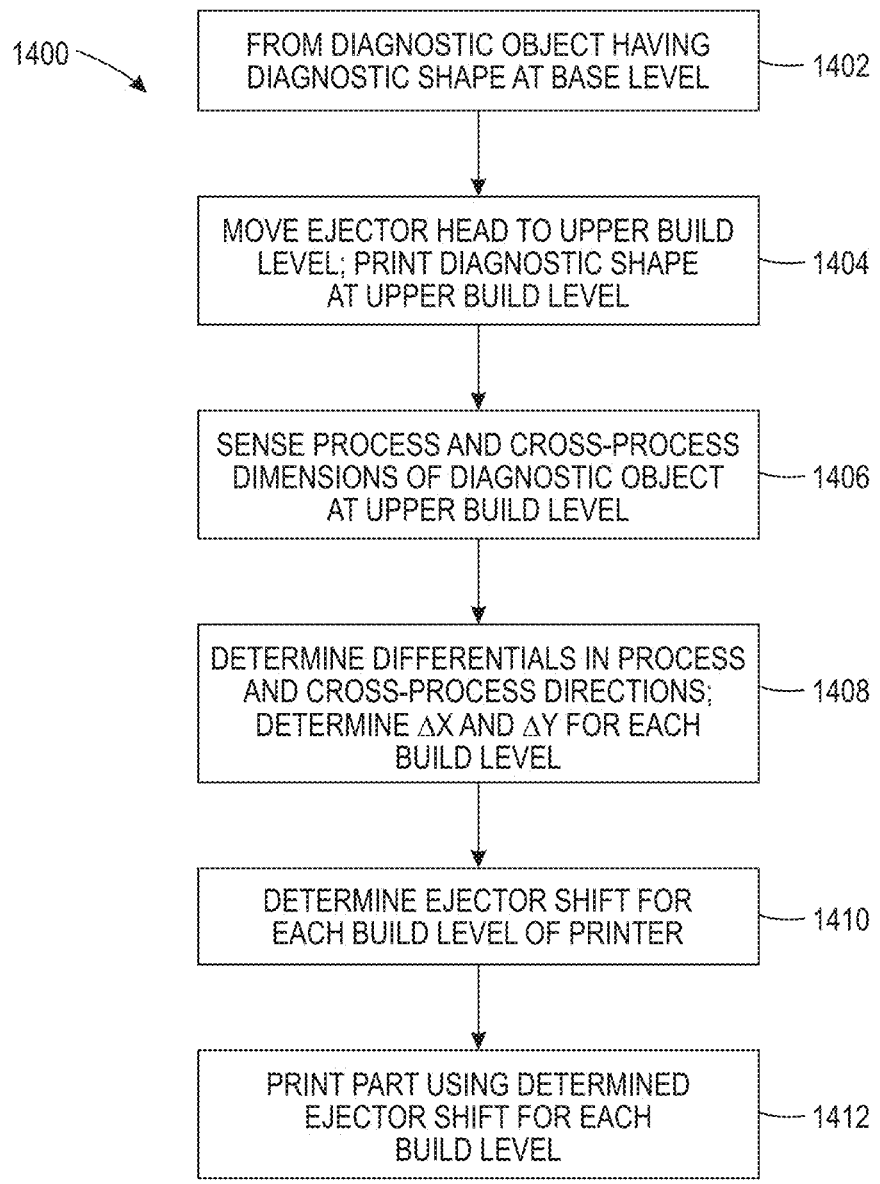
FIG. 14 shows a flow diagram for a method of operating the three-dimensional object printer of FIG. 1.

FIG. 14 is a block diagram illustrating a method 1400 of operating a three-dimensional object printer in view of the disclosure of FIGS. 8A-13. As shown in block 1402, the method comprises operating at least one ejector of an ejector head to eject drops of material toward a platen in order to form a diagnostic shape of a diagnostic object at a base build level, the diagnostic shape having a process direction dimension and a cross-process direction dimension at the base build level (e.g., see FIGS. 10 and 12A). As shown in block 1404, the method further comprises moving the ejector head relative to the base build level along a build axis such that the ejector head is moved further away from the base build level. Then, as also shown in block 1404, the method includes operating the at least one ejector of the ejector head to build the diagnostic shape of the diagnostic object at an upper build level along the build axis (e.g., see FIGS. 10 and 12B). Moving to block 1406, the method continues by sensing a process direction dimension and a cross-process direction dimension of the diagnostic shape at the upper build level. As shown in block 1408, the method then proceeds by determining a differential (dx, dy) between at least one dimension at the base build level and the upper build level (e.g., see FIGS. 10 and 12C). This differential is similar to that determined in association with the method of FIG. 4 and the acts of previously described block 408. In this embodiment, the edge of the diagnostic object at the upper build level may actually be considered to be a fiducial edge, since the position of this edge is known (i.e., because the dimensions at the base build level are known, and because build material along one edge of the diagnostic object falls off of the edge with error at each successive build level, the true position of the edge at the upper level is known and serves as a fiducial). Thereafter, the method continues at block 410 by determining an ejector head shift ($\Delta x, \Delta y$) for each of a number of incremental build levels between the base build level and the upper build level based at least in part on the determined differential. After determining the ejector head shift, the method continues at block 412 by moving the ejector head and operating the at least one ejector to eject drops of material toward the platen in order to form a three-dimensional object, wherein moving the ejector head includes shifting the ejector head relative to the platen by the determined ejector head shift for each of the incremental build levels prior to ejecting drops of material at said incremental build levels. The blocks 410 and 412 involve the performance of acts that are similar to those previously described in association with FIG. 4 at blocks 412 and 414.

The embodiments described above are but a few exemplary embodiments of a 3D object printing system with compensation for misregistration. It will be appreciated that variants of the above-disclosed and other features and functions, or alternatives thereof, may be desirably combined into many other different systems, applications or methods. Furthermore, various presently unforeseen or unanticipated alternatives, modifications, variations, or improvements therein may be subsequently made by those skilled in the art, which are also intended to be encompassed by the following claims.

What is claimed is:

1. A method of operating a three-dimensional object printer, the method comprising:
    operating at least one ejector of an ejector head to eject at least one first drop of material toward a first build surface provided on a platen at a first build level along a build axis;
    operating a sensor to measure first distance components of the first drop of material from a first fiducial reference on the first build surface, the first distance components including a first process direction component along a process axis and a first cross-process direction component along a cross-process axis;
    moving the ejector head relative to the platen along the build axis;
    placing a gauge block on the platen, the gauge block providing a second build surface at a second build level along the build axis;
    operating the at least one ejector of the ejector head to eject at least one second drop of material toward the second build surface;
    operating the sensor to measure second distance components of the second drop of material from a second fiducial reference on the second build surface, the second distance components including a second process direction component and a second cross-process direction component;
    calculating differentials between the first distance components and the second distance components, the calculated differentials including a process direction differential and a cross-process direction differential;
    determining an ejector head shift relative to the platen for a plurality of incremental build levels along the build axis between the first build level and the second build level, wherein the determined ejector head shift for each of the incremental build levels is based on the calculated differentials; and
    moving the ejector head and operating the at least one ejector to eject drops of material toward the platen in order to form a three-dimensional object, wherein moving the ejector head includes shifting the ejector head relative to the platen by the determined ejector head shift for each of the plurality of incremental build levels prior to ejecting drops of material at said incremental build levels.

2. The method of claim 1 wherein placing the gauge block on the platen includes aligning registration features on the platen with complementary features on the gauge block.

3. The method of claim 1 wherein moving the ejector head relative to the platen along the build axis includes moving the platen along the build axis.

4. The method of claim 1 wherein moving the ejector head relative to the platen along the build axis includes moving a gantry along the build axis with the ejector head positioned on the gantry.

5. The method of claim 1 wherein determining an ejector head shift relative to the platen for a plurality of incremental build levels along the build axis includes determining an ejector head shift along the process axis based on the process direction differential and determining an ejector head shift along the cross-process axis based on the cross-process direction differential.

6. The method of claim 1 wherein determining an ejector head shift includes inputting the calculated differentials to a printer control system, the printer control system configured to (i) determine a pixel adjustment for each of the incremental build levels based on the calculated differentials and (ii) shift the ejector head by the determined pixel adjustment for each of the incremental build levels.

7. The method of claim 1 wherein determining an ejector head shift includes inputting the calculated differentials to a printer control system, the printer control system configured to (i) determine a shift amount for each of the incremental build levels based on the calculated differentials, and (ii) shift a position of the ejector head upon a gantry or shift a position of the platen by the determined shift amount for each of the incremental build levels.

8. The method of claim 1 further comprising:
placing a second gauge block on the platen, the second gauge block providing a third build surface at a third build level along the build axis;
operating the at least one ejector of the ejector head to eject at least one third drop of material toward the third build surface;
operating the sensor to measure third distance components of the third drop of material from a third fiducial reference on the third build surface, the third distance components including a third process direction component and a third cross-process direction component;
calculating differentials between the second distance components and the third distance components; and
determining an ejector head shift relative to the platen for a second plurality of incremental build levels along the build axis between the second build level and the third build level based on the calculated differentials between the second distance components and the third distance components.

9. A method of operating a three-dimensional object printer, the method comprising:
operating at least one ejector of an ejector head to eject drops of material toward a platen in order to form a diagnostic shape of a diagnostic object at a base build level, the diagnostic shape having a process direction dimension and a cross-process direction dimension at the base build level;
moving the ejector head relative to the base build level along a build axis such that the ejector head is moved further away from the base build level;
operating the at least one ejector of the ejector head to build the diagnostic shape of the diagnostic object at an upper build level along the build axis;
sensing a process direction dimension and a cross-process direction dimension of the diagnostic shape at the upper build level;
determining a differential between at least one dimension at the base build level and the upper build level;
determining an ejector head shift for each of a number of incremental build levels between the base build level and the upper build level based at least in part on the determined differential; and
after determining the ejector head shift, moving the ejector head and operating the at least one ejector to eject drops of material toward the platen in order to form a three-dimensional object, wherein moving the ejector head includes shifting the ejector head relative to the platen by the determined ejector head shift for each of the incremental build levels prior to ejecting drops of material at said incremental build levels.

10. The method of claim 9 wherein the diagnostic object is a column and the diagnostic shape is a rectangular cross-sectional shape of the column.

11. The method of claim 9 wherein determining the differential between at least one dimension at the base build level and the upper build level includes sensing an absence of the diagnostic object at the upper build level such that the determined differential is identical to the dimension at the base build level.

12. The method of claim 11 wherein the diagnostic object is a first diagnostic object having a first diagnostic shape and the process direction dimension of the first diagnostic shape is greater than the cross-process direction dimension at the base build level, the method further comprising:
operating the at least one ejector to build a second diagnostic object, the second diagnostic object including a second diagnostic shape having a process direction dimension that is less than a cross-process direction dimension at the base build level;
sensing an absence of one of the first and second diagnostic objects at one of the plurality of incremental build levels;
determining a differential that is equivalent to the process direction dimension or the cross-process direction dimension of the first or second diagnostic object at the base build level based on the absence of one of the first and second diagnostic objects at the one of the incremental build levels.

13. The method of claim 9 wherein determining the ejector head shift for each of the incremental build levels includes dividing the determined differential by the number of incremental build levels.

14. The method of claim 1 wherein the process axis is perpendicular to the cross-process axis, wherein the build axis is perpendicular to both the process axis and the cross-process axis, and wherein the platen is in a plane that is perpendicular to the build axis.

* * * * *